(12) United States Patent
Biyani et al.

(10) Patent No.: US 11,915,693 B2
(45) Date of Patent: Feb. 27, 2024

(54) SYSTEM AND METHOD FOR RULE BASED MODIFICATIONS TO VARIABLE SLOTS BASED ON CONTEXT

(71) Applicant: YAHOO ASSETS LLC, Dulles, VA (US)

(72) Inventors: Prakhar Biyani, Sunnyvale, CA (US); Cem Akkaya, San Jose, CA (US); Kostas Tsioutsiouliklis, San Jose, CA (US)

(73) Assignee: YAHOO ASSETS LLC, Dulles, VA (US)

( * ) Notice: Subject to any disclaimer, the term of this patent is extended or adjusted under 35 U.S.C. 154(b) by 139 days.

(21) Appl. No.: 17/027,173

(22) Filed: Sep. 21, 2020

(65) Prior Publication Data

US 2021/0074278 A1 Mar. 11, 2021

Related U.S. Application Data

(63) Continuation of application No. 15/902,460, filed on Feb. 22, 2018, now Pat. No. 10,783,879.

(51) Int. Cl.
*G10L 15/00* (2013.01)
*G10L 15/19* (2013.01)
(Continued)

(52) U.S. Cl.
CPC ............. *G10L 15/19* (2013.01); *G06F 40/30* (2020.01); *G06F 40/55* (2020.01); *G10L 15/22* (2013.01); *G10L 15/26* (2013.01); *G06F 40/295* (2020.01); *G10L 15/183* (2013.01); *G10L 15/1822* (2013.01)

(58) Field of Classification Search
CPC ....... G10L 15/07; G10L 15/08; G10L 15/063; G10L 15/20; G10L 15/22; G10L 15/30; G10L 15/16; G10L 25/30; G10L 15/02; G10L 15/1822; G10L 15/183; G10L 15/19; G10L 15/193; G10L 15/14; G10L 15/197; G10L 25/27; G10L 19/00; G10L 19/005;
(Continued)

(56) References Cited

U.S. PATENT DOCUMENTS 6,246,981 B1 6/2001 Papineni et al.
6,314,398 B1 11/2001 Junqua et al.
(Continued)

OTHER PUBLICATIONS

Office Action dated Sep. 29, 2020 in U.S. Appl. No. 15/902,438.
(Continued)

*Primary Examiner* — Vu B Hang
(74) *Attorney, Agent, or Firm* — Venable LLP

(57) ABSTRACT

Methods, programming, and system for modifying a slot value are described herein. In a non-limiting embodiment, an intent may be determined based on a first utterance. A first slot-value pair may be obtained for the first utterance based on the intent, the first slot-value pair including a first slot and a first value associated with the first slot. A second value associated with the first slot may be identified, the second value being identified from a second utterance that was previously received. Based on the intent and the first slot, a type of update to be performed with respect to the second value may be determined. The second value may then be updated based on the first value and the type of update.

20 Claims, 24 Drawing Sheets

(51) Int. Cl.
*G10L 15/26* (2006.01)
*G10L 15/22* (2006.01)
*G06F 40/30* (2020.01)
*G06F 40/55* (2020.01)
*G06F 40/295* (2020.01)
*G10L 15/18* (2013.01)
*G10L 15/183* (2013.01)

(58) Field of Classification Search
CPC ...... G06F 40/30; G06F 40/211; G06F 40/268; G06F 40/284
See application file for complete search history.

(56) References Cited

U.S. PATENT DOCUMENTS

| | | | |
|---|---|---|---|
| 9,721,570 | B1 | 8/2017 | Beal et al. |
| 10,418,032 | B1* | 9/2019 | Mohajer ............. G10L 15/1815 |
| 2004/0044952 | A1 | 3/2004 | Jiang et al. |
| 2006/0009973 | A1* | 1/2006 | Nguyen .................. G10L 15/22 704/E15.04 |
| 2007/0106497 | A1 | 5/2007 | Ramsey et al. |
| 2007/0130124 | A1 | 6/2007 | Ramsey et al. |
| 2015/0378972 | A1 | 12/2015 | Kapadia et al. |
| 2016/0293162 | A1 | 10/2016 | Takahashi et al. |

OTHER PUBLICATIONS

Notice of Allowance dated May 20, 2020 in U.S. Appl. No. 15/902,460.
Final Office Action dated Mar. 26, 2020 in U.S. Appl. No. 15/902,438.
Office Action dated Sep. 19, 2019 in U.S. Appl. No. 15/902,438.
Office Action dated May 24, 2019 in U.S. Appl. No. 15/902,438.
Office Action dated Jan. 25, 2019 in U.S. Appl. No. 15/902,438.
Notice of Allowance in U.S. Appl. No. 15/902,438.

* cited by examiner

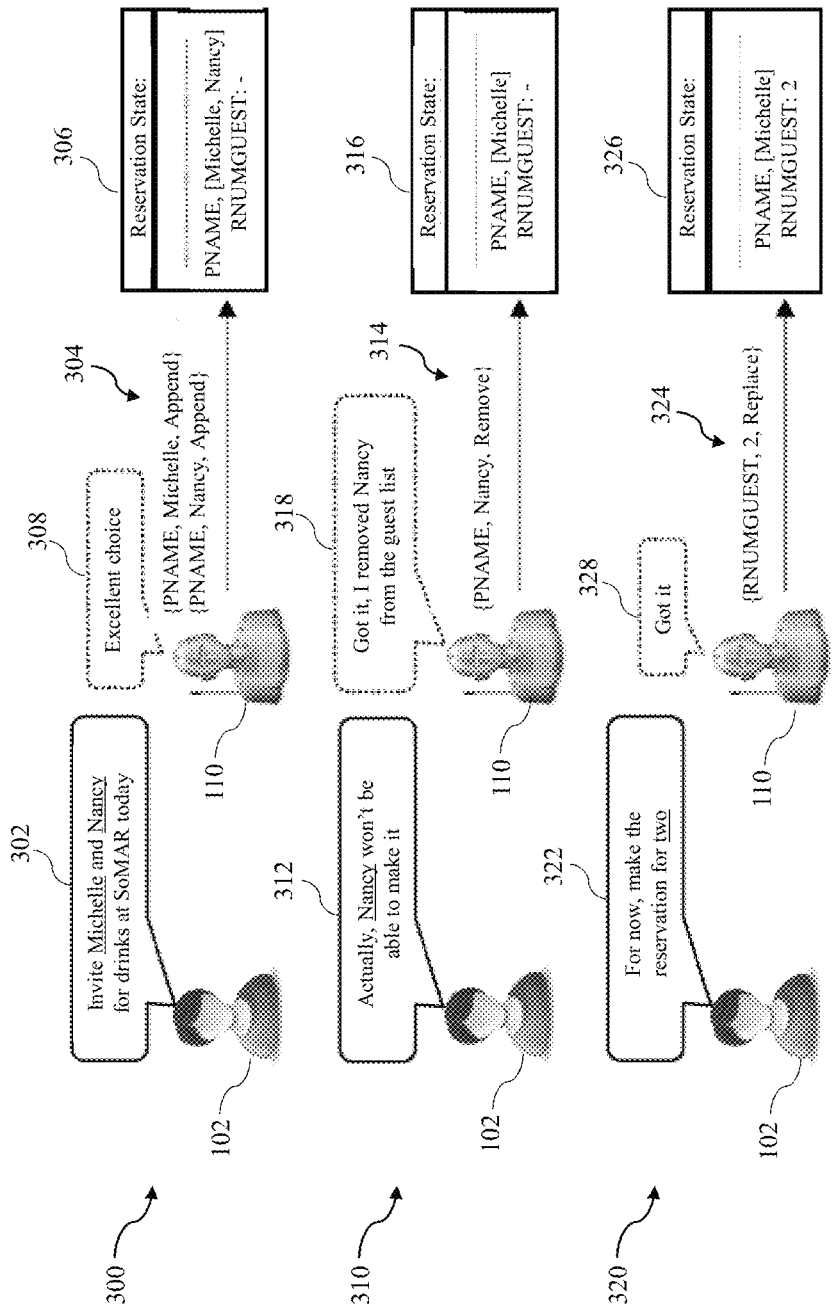

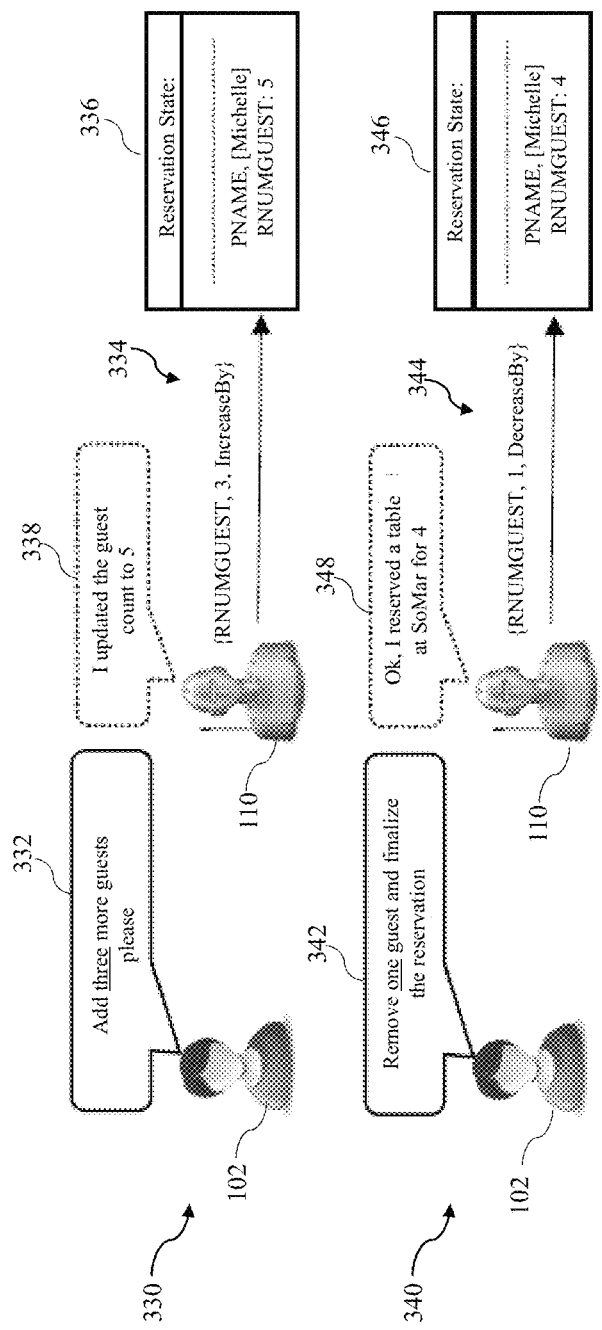

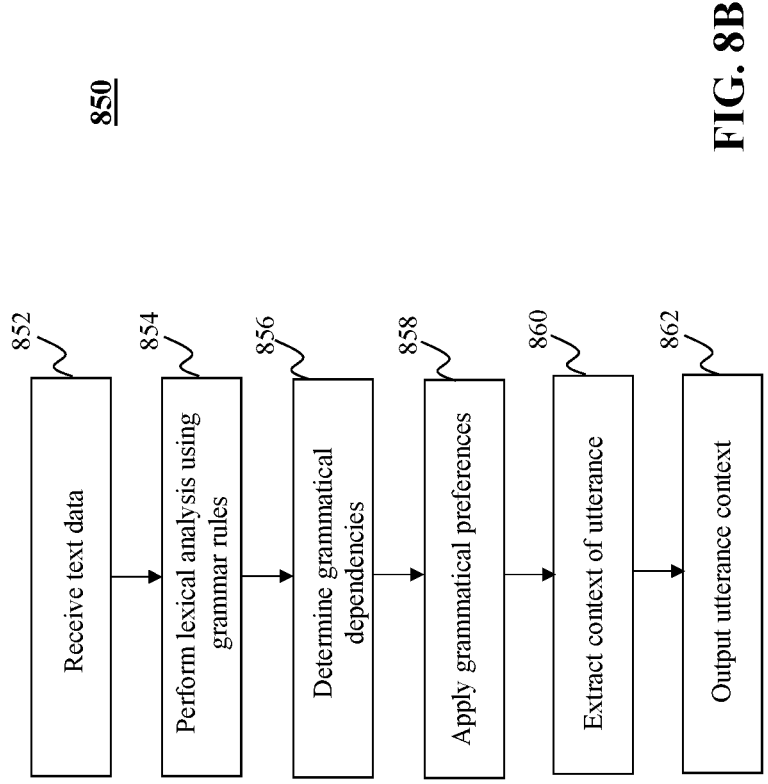

SYSTEM AND METHOD FOR RULE BASED MODIFICATIONS TO VARIABLE SLOTS BASED ON CONTEXT

CROSS-REFERENCE TO RELATED APPLICATIONS

The present application is a continuation of U.S. patent application Ser. No. 15/902,460, filed Feb. 22, 2018, which is incorporated herein by reference in its entirety.

This application relates to commonly-assigned U.S. patent application Ser. No. 15/902,438, entitled "System and Method for Identifying and Replacing Slots with Variable Slots," filed Feb. 22, 2018, which is incorporated by reference herein in its entirety.

BACKGROUND

1. Technical Field

The present teaching generally relates to speech-processing and dialogue state management. More specifically, the present teaching relates to a system and method for identifying and replacing slots from an utterance with variable slots. Furthermore, the presenting teaching relates to a system and method for performing rule based modifications to variable slots based on context.

2. Technical Background

Automated conversation mechanisms often allow users to converse with an intelligent agent to perform simplistic tasks. For example, "chatbots," or "conversational agents," have been employed by many web-based systems to enable users to quickly and easily obtain information, generally converse, and/or perform tasks. The latter—task-based conversations—are known to be difficult to model between users and such conversational agents. The reasoning is that a user's utterances, and thus specific intents (e.g., a task to be performed), may be complex. An additionally reasoning is that it can be difficult to track a user's goals throughout the conversation in an intelligent manner.

When an utterance is received, whether it be from audio or text, the utterance is analyzed using natural language understanding ("NLU") techniques to understand an intent of the utterance. NLU works to identify slot-value pairs expressed in the utterance, where a slot corresponds to an entity type, and a value is associated with that slot. For example, the utterance, "Call mom" may have an intent associated with performing a telephone call (or other communication means) with an entity: "mom." In this particular utterance, one slot-value pair that is recognized may be {Name: "mom"}.

However, traditional NLU techniques have difficulty in inferring updates to the slots mentioned during each conversational turn. For example, the context associated with a first utterance between a user and a conversational agent may be difficult to track in relation to a second, subsequent utterance between the user and the conversational agent. This is because the typical NLU approach is to perform updates to slots with a "replace" function. With the replace function, a previous value associated with a slot is replaced with a new value associated with that slot. This can fail to solve the problem associated with numeric slots and slots having multiple values, as the replace function fails to accurately update the dialogue state to reflect the implications of the new utterance.

Thus, there is a need for methods and systems that accurately estimate updates, and perform such updates, to slots for facilitating accurate dialogue-state management of user-agent conversations.

SUMMARY

The teachings disclosed herein relate to methods, systems, and programming for identifying and replacing slots with variable slots. More particularly, the present teaching relates to methods, systems, and programming related to identifying and replacing slots from an utterance with at least one of multi-value slots and adjustable slots. Additionally, the present teachings disclosed herein relate to methods, systems, and programming for performing rule-based modifications to variable slots based on context. More particularly, the present teaching relates to methods, systems, and programming related to modifying at least one of multi-value slots and adjustable slots based on context and one or more rules.

In one example, a method for identifying one or more variable slots within an utterance, implemented on a machine having at least one processor, memory, and communications platform capable of connecting to a network, is described. The method may include obtaining a first slot-value pair for a first utterance. The first slot-value pair may include a first slot and a first value associated with the first slot. The first slot may be of a first entity type, where an intent and a data object may be estimated based on the first utterance. The method may also include identifying a data structure representing the data object. The method may further include determining, based on the intent, a first variable slot in the data structure associated with the first entity type. The first variable slot may be associated with at least one of: multiple values and an adjustable value. The method may further still include assigning, based on the intent, the first value to the first variable slot in the data structure.

Other concepts relate to software for implementing the present teaching on identifying one or more variable slots within an utterance. A software product, in accord with this concept, includes at least one machine-readable non-transitory medium and information and/or instructions stored thereon. The instructions stored on the medium may include executable program code data, parameters in association with the executable program code, and/or information related to a user, a request, content, and/or information related to identifying one or more variable slots within an utterance, etc.

In one example, a machine-readable, non-transitory and tangible medium having instructions recorded thereon for identifying one or more variable slots within an utterance is described. The instructions, when executed by at least one processor of a computing device, may cause the computing device to obtain a first slot-value pair for a first utterance, the first slot-value pair including a first slot and a first value associated with the first slot, the first slot being of a first entity type, where an intent and a data object are estimated based on the first utterance; identify a data structure representing the data object; determine, based on the intent, a first variable slot in the data structure associated with the first entity type, where the first variable slot is associated with at least one of: multiple values and an adjustable value; and assign, based on the intent, the first value to the first variable slot in the data structure.

In a different example, a system for identifying one or more variable slots within an utterance is described. The system may include memory and at least one processor. The at least one processor may be operable to obtain a first slot-value pair for a first utterance, the first slot-value pair including a first slot and a first value associated with the first slot, the first slot being of a first entity type, where an intent and a data object are estimated based on the first utterance; identify a data structure representing the data object; determine, based on the intent, a first variable slot in the data structure associated with the first entity type, where the first variable slot is associated with at least one of: multiple values and an adjustable value; and assign, based on the intent, the first value to the first variable slot in the data structure.

In another example, a method for modifying a slot value, implemented on a machine having at least one processor, memory, and communications platform capable of connecting to a network, is described. The method may include determining an intent based on a first utterance, where a first slot-value pair may be obtained for the first utterance based on the intent, the first slot-value pair including a first slot and a first value associated with the first slot. The method may also include identifying a second value associated with the first slot, the second value being identified from a second utterance that was previously received. The method may further include determining, based on the intent and the first slot, a type of update to be performed with respect to the second value, and updating the second value based on the first value and the type of update.

Other concepts relate to software for implementing the present teaching on modifying a slot value. A software product, in accord with this concept, includes at least one machine-readable non-transitory medium and information and/or instructions stored thereon. The instructions stored on the medium may include executable program code data, parameters in association with the executable program code, and/or information related to a user, a request, content, and/or information related to modifying a slot value, etc.

In one example, a machine-readable, non-transitory and tangible medium having instructions recorded thereon for modifying a slot value is described. The instructions, when executed by at least one processor of a computing device, may cause the computing device to: determine an intent based on a first utterance, where a first slot-value pair is obtained for the first utterance based on the intent, the first slot-value pair including a first slot and a first value associated with the first slot; identify a second value associated with the first slot, the second value being identified from a second utterance that was previously received; determine, based on the intent and the first slot, a type of update to be performed with respect to the second value; and update the second value based on the first value and the type of update.

In still a different example, a system for modifying a slot value is described. The system may include memory and at least one processor. The at least one processor may be operable to: determine an intent based on a first utterance, where a first slot-value pair is obtained for the first utterance based on the intent, the first slot-value pair including a first slot and a first value associated with the first slot; identify a second value associated with the first slot, the second value being identified from a second utterance that was previously received; determine, based on the intent and the first slot, a type of update to be performed with respect to the second value; and update the second value based on the first value and the type of update.

Additional novel features will be set forth in part in the description that follows, and in part will become apparent to those skilled in the art upon examination of the following and the accompanying drawings or may be learned by production or operation of the examples. The novel features of the present teachings may be realized and attained by practice or use of various aspects of the methodologies, instrumentalities and combinations set forth in the detailed examples discussed below.

BRIEF DESCRIPTION OF THE DRAWINGS

The methods, systems and/or programming described herein are further described in terms of exemplary embodiments. These exemplary embodiments are described in detail with reference to the drawings. These embodiments are non-limiting exemplary embodiments, in which like reference numerals represent similar structures throughout the several views of the drawings, and wherein:

FIGS. 3A-E are illustrative diagrams of an exemplary user-conversation management system interaction including dialogue-state updates, in accordance with various embodiments of the present teaching;

FIG. 8B is an illustrative flowchart of an exemplary process for extracting a content of an utterance, in accordance with various embodiments of the present teaching;

DETAILED DESCRIPTION

Figure 1A:
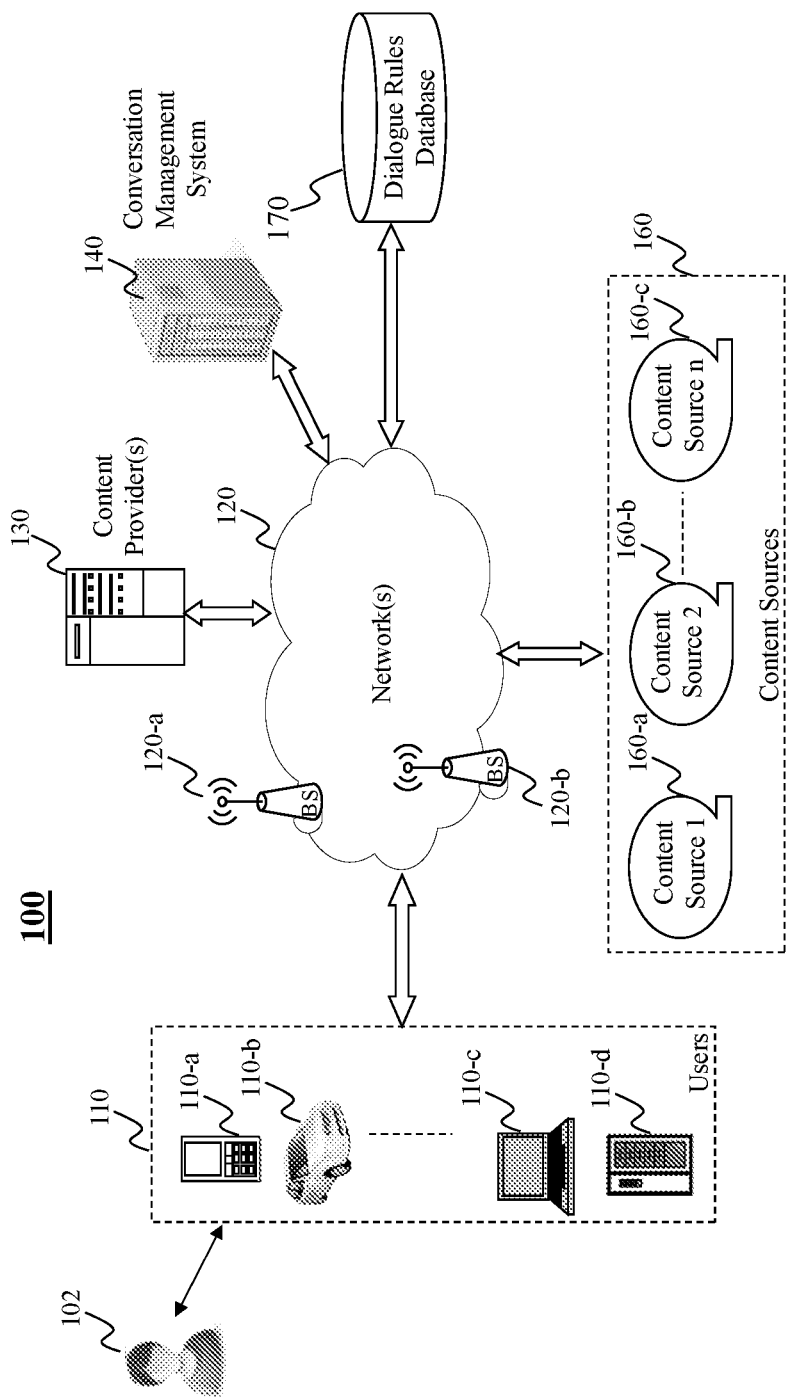
FIGS. 1A and 1B are illustrative diagrams of exemplary network environment for facilitating dialogue between a user operating a user device and a conversation management system, in accordance with various embodiments of the present teaching.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

The present teaching aims to eliminate the limitation of the prior technologies, and to track and manage a dialogue state between a user and a conversational agent. More specifically, the present teaching aims to identify and perform updates to slots from slot-value pairs identified within an utterance. In particular, the present teaching describes identifying variable slots within an utterance that are capable of taking on at least one of multiple values and numeric values.

The present teaching generally relates to systems, methods, mediums, and other implementations directed to overcoming various limitations of the prior systems/methods, and in particular to managing a dialogue-state between a user and a conversational agent. In traditional dialogue-state management, state updates are performed by replacing an old/previous value associated with a slot with a new value identified from a new utterance. As an illustrative example, consider the following utterances, obtained by a dialogue state tracking system in succession: "Create an event for two people," and "Add three people to the event." Looking at the first utterance, the intent determined may be for a data object (e.g., an event") to be created, and an entity type—number of people—may be identified having a slot corresponding to the entity type and an associated value, two. For instance, the intent may be {Intent: Create Event List}, and the slot-value pair may be {Number of People: 2}. When the second utterance is looked at, the same entity—number of people—is identified within the utterance, however having the value, three (e.g., {Number of People: 3}. In this particular scenario, standard NLU techniques may indicate that, because the utterance included will a same entity type, the correspond slot value is to be replaced with the new slot value. Therefore, using standard NLU techniques, the number of people associated with the "event" may be incorrectly stored as being 3, when the correct value should be 5.

In order to overcome the aforementioned issues, the present teaching describes systems, methods, and programming for replacing single value slots of slot-value pairs identified for an utterance with variable slots. A variable slot, as described herein, may include a multi-value slot and/or an adjustable slot. A multi-value slot, as described herein, may correspond to a slot that is capable of being associated with one or more values. For example, if a first utterance received was, "Make a reservation for Jack and John," an entity "name," having a corresponding slot "Name," may have the values "Jack" and "John" associated therewith (e.g., {Name: "Jack," "John"). An adjustable slot, which may also be referred to herein interchangeably as a numeric slot, may correspond to a slot whose value may be increased, decreased, and/or replaced. For example, using the aforementioned utterances—"Create an event for two people," and "Add three people to the event,"—a numeric slot may initially have the value 2 (e.g., {Number of Guests: 2}), which may be increased upon processing of the second utterance to the value 5 (e.g., {Number of Guests: 5}).

As exemplified above, another aspect of the present teaching describes systems, methods, and programming for identifying a type of update to be performed in associated with one or more variable slots of an utterance. In some embodiments, the type of update to be performed may include, but is not limited to, appending, removing, increasing, decreasing, and/or replacing. Additionally, no update performed may also correspond to a type of update that is possible. An appending update may add a value as being associated with a slot. A removing update may remove a value from being associated with a slot. An increasing update may increase a value associated with a slot by a specified amount. A decreasing update may decrease a value associated with a slot by a specified amount. A replacing update may replace the value of a slot by a particular value.

Persons of ordinary skill in the art will recognize that the aforementioned and foregoing descriptions are not intended to be limiting, and instead are illustrative embodiments associated with the present teaching. Various additions and augmentations consistent with that known to one of ordinary skill in the art are understood as being within the spirit of the present disclosure.

Figure 1B:
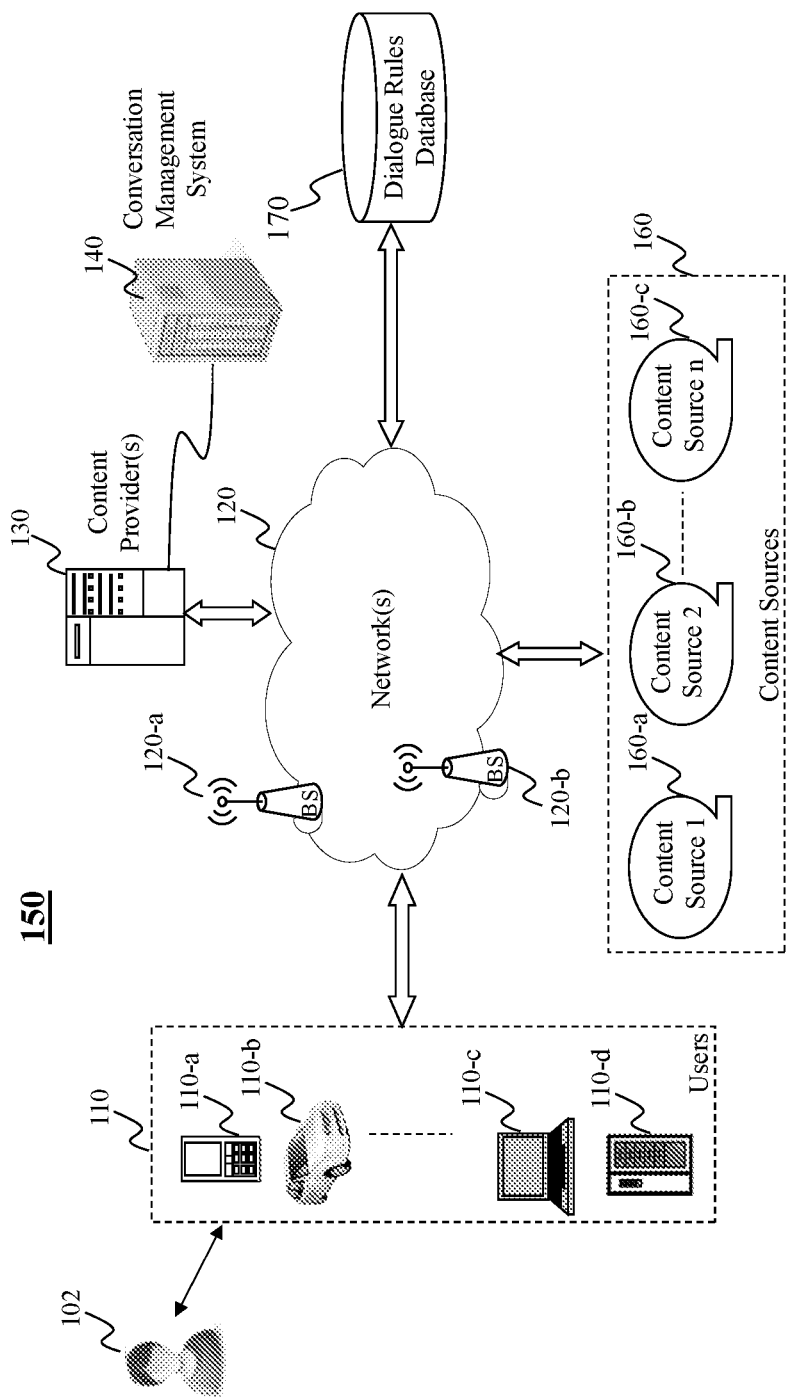

FIGS. 1A and 1B are illustrative diagrams of exemplary network environment for facilitating dialogue between a user operating a user device and a conversation management system, in accordance with various embodiments of the present teaching. In FIG. 1A, an exemplary networked environment 100 is described. Exemplary networked environment 100 may include one or more user devices 110, such as user devices 110-*a*, 110-*b*, 110-*c*, and 110-d, one or more content sources 160, a conversation management system 140, one or more content providers 130, and a dialogue rules database 170, each of which may communicate with one another via one or more networks 120.

Network(s) 120, in some embodiments, may correspond to a single network or a combination of different networks. For example, network(s) 120 may be a local area network ("LAN"), a wide area network ("WAN"), a public network, a private network, a proprietary network, a Public Telephone Switched Network ("PSTN"), the Internet, an intranet, a wireless network, a virtual network, and/or any combination thereof. In one embodiment, network(s) 120 may also include various network access points. For example, environment 100 may include wired and/or wireless access points such as, and without limitation, base stations or Internet exchange points 120-*a* and 120-*b*. Base stations 120-*a* and 120-*b* may facilitate, for example, communications to/from user device(s) 110 and/or conversation management system 140 with one another as well as, or alternatively, one or more other components of environment 100 across network(s) 120.

User devices 110 may be of different types to facilitate one or more users operating user devices 110 to connect to network(s) 120. User devices 110 may correspond to any suitable type of electronic/computing device including, but not limited to, desktop computers 110-*d*, mobile devices 110-*c* (e.g., mobile phones, smart phones, personal display devices, personal digital assistants ("PDAs"), gaming consoles/devices, wearable devices (e.g., watches, pins/broaches, headphones, etc.), transportation devices 110-*b* (e.g., cars, trucks, motorcycles, boats, ships, trains, airplanes), mobile computers 110-*c* (e.g., laptops, ultrabooks), smart devices (e.g., televisions, set top boxes, smart televisions), smart household devices (e.g., refrigerators, microwaves, etc.), and/or smart accessories (e.g., light bulbs, light switches, electrical switches, etc.). A user 102, in one embodiment, may send data (e.g., a request) and/or receive data (e.g., content) via user devices 110. For example, user 102 may speak, type, or otherwise input an utterance to their user device 110, which in turn may be communicated to conversation management system 140 across network(s) 120.

Content providers 160 may include one or more content providers 160-1, 160-2, and 160-3, in some embodiments. Although three content providers are shown within environment 100, any number of content providers may be included. Content providers 160 may correspond to any suitable content source, such as, and without limitation, an individual, a business, an organization, and the like. For example, content providers 160 may correspond to a government website, a news site, a social media website, and/or a content feed source (e.g., a blog). In some embodiments, content providers 160 may be vertical content sources. Each content source 160 may be configured to generate and send content to one or more of user devices 110 via network(s) 120. The content (e.g., a webpage) may include information consumable by user 102 via their user device 110.

Content provider(s) 130 may correspond to one or more publishers that publish content and/or advertisements. For example, publishers 130 may be configured to present content obtained from one or more of content providers 160. In some embodiments, publishers 130 may present one or more advertisements thereon, which may be selected from an advertisement database, an advertisement source, and/or any other suitable source. In some embodiments, publishers 130 configured to provide product(s) and/or service(s), and may be configured to handle the advertising process for its own product(s) and/or a service (e.g., websites, mobile applications, etc.) related to advertising, or a combination thereof. For example, publishers 130 may include such systems as an advertising agency or a dealer of advertisement that operates a platform that connects an advertiser or advertising agency one or more additional entities.

Conversation management system 140, in some embodiments, may be configured to facilitate a dialogue with user 102 operating user device 110. A dialogue may include one or more communications between user device 110 and conversation management system 140 including, but not limited to, utterances, images, video, audio, and the like. In some embodiments, conversation management system 140 may be configured to determine whether an utterance includes one or more variable slots, and may replace single-valued slots with a variable slot. A variable slot, as described above and herein, may correspond to one or more of a multi-value slot and an adjustable slot. Therefore, conversation management system 140 may be capable of performing an update to a value associated with a slot based on the type of update determined to be associated with an intent of the utterance, as well as the previous value associated with that slot, a new value associated with that slot, and the type of update. Furthermore, conversation management system 140 may access dialogue rules database 170 to identify and determine a type of update to be performed based on one or more dialogue rules. For instance, the one or more dialogue rules may indicate how to identify a context of an update, as well as how to identify the type of update to be performed based on the context.

Networked environment 150 of FIG. 1B, in one illustrative embodiment, may be substantially similar to networked environment 100 of FIG. 1A, with the exception that conversation management system 140 may connect to content provider(s) 130 as a backend as opposed to via network(s) 120. Still, in other embodiments, dialogue rules database 170 may also connect to conversation management system 140 and/or content provider(s) 130 as a backend, as opposed to via network(s) 120. Persons of ordinary skill in the art will recognize that one or more features of conversation management system 140 and/or dialogue rules database 170 may be stored locally by user device(s) 110.

Figure 2A:
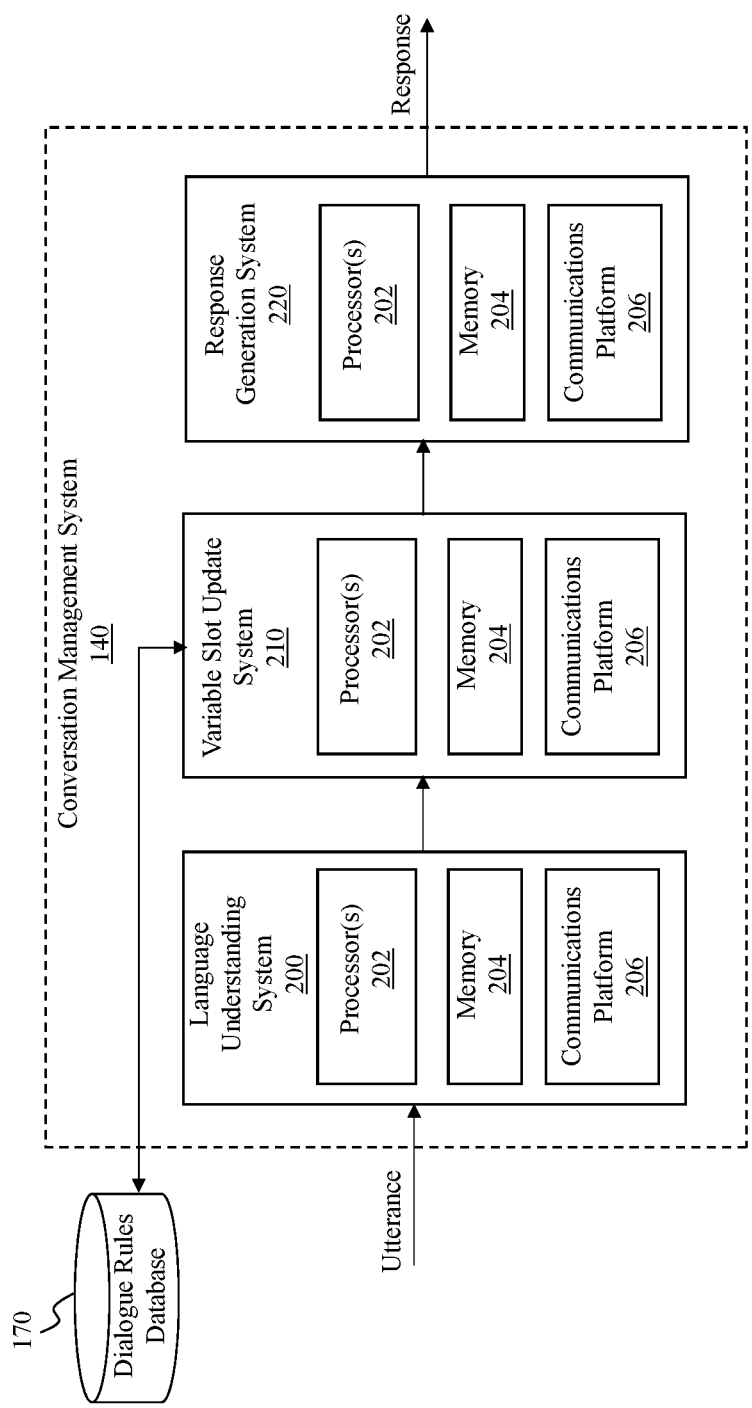
FIG. 2A is an illustrative diagram of an exemplary conversation management system, in accordance with various embodiments of the present teaching.

FIG. 2A is an illustrative diagram of an exemplary conversation management system, in accordance with various embodiments of the present teaching. In the illustrative embodiment, conversation management system 140 may include, amongst other components, a language understanding system 200, a variable slot update system 210, and a response generation system 220. Each of language understanding system 200, variable slot update system 210, and response generation system 220 may include one or more processors 202, memory 204, and communications circuitry 206. Furthermore, dialogue rules database 130 may be in communication with variable slot update system 210 to apply one or more dialogue rules stored therein.

Processor(s) 202 may include any suitable processing circuitry capable of controlling operations and functionality of one or more components/modules of conversation management system 140, such as language understanding system 200, variable slot update system 210, and response generation system 220. Processor(s) 202 may also facilitate communications between various components within one or more of language understanding system 200, variable slot update system 210, and response generation system 220, as well as, or alternatively, with one or more other systems/components of conversation management system 140. In some embodiments, processor(s) 202 may include a central processing unit ("CPU"), a graphic processing unit ("GPU"), one or more microprocessors, a digital signal processor, or any other type of processor, or any combination thereof. In some embodiments, the functionality of processor(s) 202 may be performed by one or more hardware logic components including, but not limited to, field-programmable gate arrays ("FPGA"), application specific integrated circuits ("ASICs"), application-specific standard products ("ASSPs"), system-on-chip systems ("SOCs"), and/or complex programmable logic devices ("CPLDs"). Furthermore, each of processor(s) 202 may include its own local memory, which may store program systems, program data, and/or one or more operating systems. However, processor(s) 202 may run an operating system ("OS") for one or more components of conversation management system 140 (e.g., language understanding system 200, variable slot update system 210, and response generation system 220), and/or one or more firmware applications, media applications, and/or applications resident thereon. In some embodiments, processor(s) 202 may run a local client script for reading and rendering content received from one or more websites or external content sources. For example, processor(s) 202 may run a local JavaScript client for rendering HTML or XHTML content received from a particular URL accessed by user device(s) 110.

Memory 204 may include one or more types of storage mediums such as any volatile or non-volatile memory, or any removable or non-removable memory implemented in any suitable manner to store data for one or more of language understanding system 200, variable slot update system 210, and response generation system 220. For example, information may be stored using computer-readable instructions, data structures, and/or program systems. Various types of storage/memory may include, but are not limited to, hard drives, solid state drives, flash memory, permanent memory (e.g., ROM), electronically erasable programmable read-only memory ("EEPROM"), CD-ROM, digital versatile disk ("DVD") or other optical storage medium, magnetic cassettes, magnetic tape, magnetic disk storage or other magnetic storage devices, RAID storage systems, or any other storage type, or any combination thereof. Furthermore, memory 204 may be implemented as computer-readable storage media ("CRSM"), which may be any available physical media accessible by processor(s) 202 to execute one or more instructions stored within memory 204. In some embodiments, one or more applications (e.g., tutoring programs, educational programs, games, music, video, calendars, lists, etc.) may be stored within memory 204. Processor(s) 202 may be configured to execute one or more instructions associated with those applications, where the one or more instructions are operable to be stored within memory 204 (either persistently or temporarily).

Communications platform 206 may include any communications platform and/or circuitry allowing or enabling one or more components of conversation management system 140 (e.g., language understanding system 200, variable slot update system 210, and response generation system 220) to communicate with one another, and/or with one or more additional devices, servers, databases (e.g., dialogue rules database 170), and/or systems. For example, communications platform 206 may facilitate communications between two or more of language understanding system 200, variable slot update system 210, and response generation system 220, or between one or more components of conversation management system 140. In some embodiments, communications between one or more components of conversation management system 140 may be communicated using user device(s) 110 across network(s) 120 via communications platform 206. For example, network(s) 120 may be accessed using Transfer Control Protocol and Internet Protocol ("TCP/IP") (e.g., any of the protocols used in each of the TCP/IP layers), Hypertext Transfer Protocol ("HTTP"), WebRTC, SIP, and/or wireless application protocol ("WAP"). Various additional communication protocols may be used to facilitate communications between various components of conversation management system 140 and/or to/from conversation management system 140, including, but not limited to, Wi-Fi (e.g., 802.11 protocol), Bluetooth, radio frequency systems (e.g., 900 MHz, 1.4 GHz, and 5.6 GHz communication systems), cellular networks (e.g., GSM, AMPS, GPRS, CDMA, EV-DO, EDGE, 3GSM, DECT, IS 136/TDMA, iDen, LTE or any other suitable cellular network protocol), infrared, BitTorrent, FTP, RTP, RTSP, SSH, and/or VOIP.

Communications platform 206 may use any communications protocol, such as any of the previously mentioned exemplary communications protocols. In some embodiments, one or more components of conversation management system 140 (e.g., language understanding system 200, variable slot update system 210, and response generation system 220 may include one or more antennas to facilitate wireless communications with a network using various wireless technologies (e.g., Wi-Fi, Bluetooth, radiofrequency, etc.). In yet another embodiment, one or more components of conversation management system 140 may include one or more universal serial bus ("USB") ports, one or more Ethernet or broadband ports, and/or any other type of hardwire access port so that communications platform 206 facilitates communications with one or more communications networks (e.g., network(s) 120).

Language processing system 200, in one example, may be configured to receive an utterance and perform one or more language processing techniques to determine features associated with the utterance. In some embodiments, language understanding system 200 may receive audio data representing the utterance, which may be received from user device 110. Alternatively (or additionally), language understanding system 200 may receive text data representing the utterance, and/or any other data representative of a user intent (e.g., image data, video data, etc.). In one embodiment, if audio data representing the utterance is received, language processing system 200 may be configured to generate text data representing the utterance using speech-to-text processing, as described in greater detail below.

The data representing the utterance, for instance text data, may be analyzed by language processing system 200 to determine what was "said" in the utterance. For instance, the utterance, "Call mom," may be a request to facilitate a telephonic/VOIP communication with a contact entitled "mom." In some embodiments, language processing system 200 may be configured to identify and output slot-value pair data representing one or more slot-value pairs identified by natural language processing ("NLP"), which may also be referred to as natural language understand ("NLU") herein interchangeably. NLU may output one or more hypotheses of an intent of an utterance based on the identified slot-value pairs. Each intent hypothesis may be ranked with a confidence score indicating a likelihood that that particular intent hypothesis reflects the user's actual intent. In some embodiments, the output data from language processing system 200 may be a vector including the identified slots, their corresponding value, and the confidence score associated with the value for that particular slot. For example, using again the utterance, "Call mom," the output from language processing system may include data indicating an intent {Intent: "Make Telephone Call," Score_X1}, and object {Contact: "Mom," Score_X2}.

Variable slot update system 210, in one embodiment, may be configured to receive the data from language understanding system 200, and determine whether the one or more slot-value pairs identified by language understanding system 200 corresponds to a variable slot; and determine a type of update to perform to the variable slot(s). Variable slot update system 210 may employ dialogue rules stored within dialogue rules database 170 to determine whether a particular intent include any entities that correspond to variable slots. If so, then variable slot update system 210 may be configured to replace those single-valued slots with variable slots, capable of taking on multiple values and/or adjustable values. As an illustrative example, variable slot update system 210 may determine that an intent of an utterance is associated with a restaurant domain. The restaurant domain may correspond to a lexical category having known entity types such as, and without limitation, cuisine, reservation, number of guests, name(s) of guests, restaurant name, restaurant location, etc. Variable slot update system 210 may determine that one of the slot-value pairs obtained from language understanding system 200 in association with an utterance (e.g., "Add Jack to the reservation," includes a slot and a value associated with that slot (e.g., {Name: "Jack"}). Variable slot update system 210 may further determine that the slot is of the entity type "Name of Guest" within the restaurant domain, and has an estimated intent of "Add Name To Reservation" associated with a data object "Reservation" determined by language processing system 200. Variable slot update system 210 may identify a data structure stored within memory 204 of variable slot update system 210 representing this reservation data object, and may determine that because the intent associated with the restaurant domain, and because the slot-value pair includes the entity type "Name of Guest," that the first slot corresponds to a variable slot. Therefore, in this particular scenario, the value "Jack" may be assigned to the variable slot "Name of Guest" within the data structure, in addition to any other names previously assigned to that slot.

Variable slot update system 210 may also be configured to determine how to update a particular value/values associated with a variable slot. For instance, variable slot update system 210 may obtain update rules from dialogue rules database 170 indicating one or more types of updates capable of being performed to a slot value, and the criteria for implanting a particular one of those updates. For instance, based on an intent of an utterance received (e.g., "Add {Name} to the reservation"), a slot value pair (e.g., {Name: "Jack"}) may be obtained by variable slot update system 210 from language understanding system 200. Variable slot update system 210 may identify that the first slot may already be associated with a second value, based on another utterance that was previously received by conversation management system 140. For example, the previous utterance may be "Create a reservation for Sam and John." From the previous utterance, a data object (e.g., a reservation/list) within a data structure stored by memory 204 of variable slot update system 210 may be created. For example, the data object may be an entry in a data structure indicating that a list corresponding to the title "Reservation." This entry may be created, and the values "Sam" and "John" may be assigned to that entry. As the intent of the first utterance may be to add a name to a reservation list, and the slot-value pair includes a slot associated with a variable "Name" slot, variable slot update system 210 may be configured to determine a type of update to be performed with respect to the second value. In this particular example, the type of update may be to add the name "Jack" to the data object "reservation" within a data structure, such that the reservation is now associated with the names "Sam," "John," and "Jack."

Response generation system 220 may be configured to generate and output a response to the utterance based on the update/action performed by variable slot update system 210. For instance, depending on the type of update performed, a particular output response may be generated. As an illustrative example, if the utterance indicates that a reservation is to be updated from including two individuals to adding three more individuals, then the output response may be "Ok. The reservation is now for five." In some embodiments, response generation system 220 may be configured to generate text data representing the output utterance, audio data representing the output utterance, one or more images, one or more videos, or any other content reflective of the response to be provided to user device 110. Furthermore, in some embodiments, the response may also include one or more instructions or actions to be performed. For example, the response may include an instruction to contact another system and/or device to indicate the update to the data object performed by variable slot update system 210.

Figure 2B:
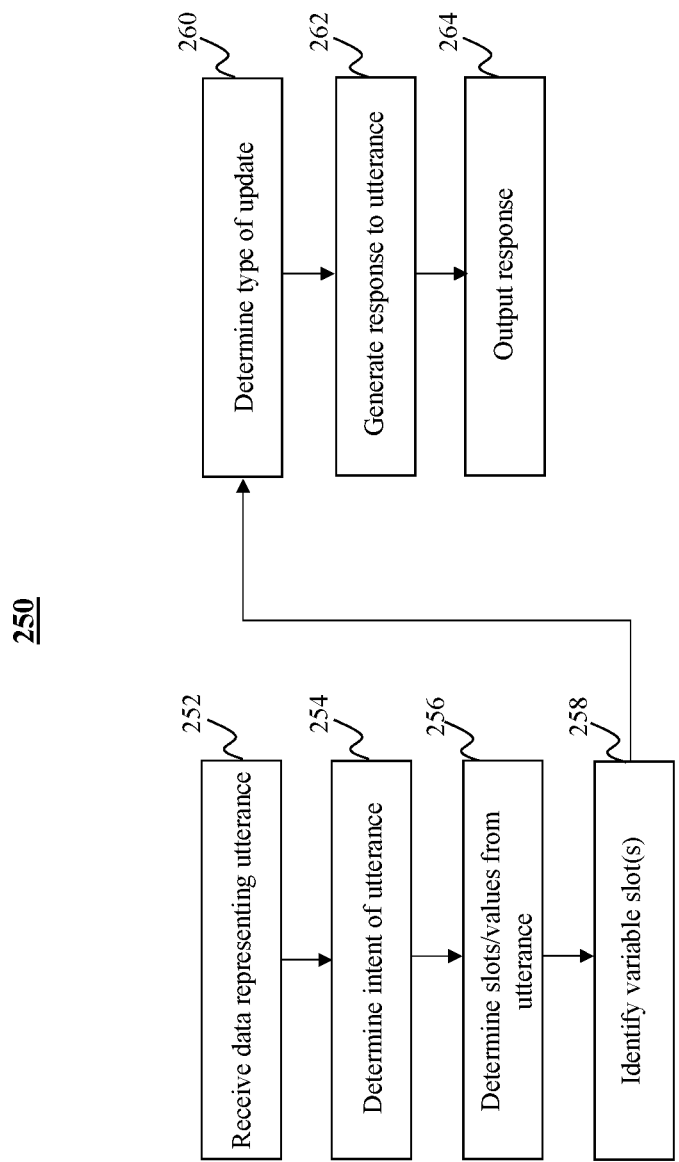
FIG. 2B is an illustrative flowchart of an exemplary process for outputting a response to an utterance, in accordance with various embodiments of the present teaching.

FIG. 2B is an illustrative flowchart of an exemplary process for outputting a response to an utterance, in accordance with various embodiments of the present teaching. In a non-limiting embodiment, process 250 may begin at step 252. At step 252, data representing an utterance may be received. For instance, audio data representing an utterance may be received by conversation management system 140, and in particular, language understanding system 200. Alternatively or additionally, text data representing the utterance may be received by language understanding system 200 of conversation management system 140.

At step 254, an intent of the utterance may be determined. The intent may be determined, in some embodiments, using NLU processing to determine an estimated meaning of the utterance. Training data may be employed to determine a format of the utterance, which may assist, for example, in interpreting the meaning of the utterance. In some embodiments, one or more hypotheses of the utterance's intent may be determined, each having a confidence score indicating the likelihood that that hypothesis corresponds to the utterance's intent.

At step 256, one or more slots, and values associated with those slots, may be determined from the utterance. In some embodiments, NLU processing may be performed to the text data to determine what entities are included within the utterance. For example, based on the intent, a domain associated with that intent may be determined, and one or more entities associated with that domain may be identified. Depending on the words included within the utterance, at least one entity may be selected. A slot (e.g., a recognized named entity) may be determined and a value associated with that slot may be tagged such that a slot-value pair is determined. For example, for the utterance "Call mom," the intent may have such entities associated with it as "Contact Name." From the utterance, the slot associated with the entity, "Contact Name," may be determined, and its corresponding value, "mom," may be tagged to that slot (e.g., {Contact Name}: "Mom").

At step 258, one or more variable slots may be identified. The variable slots may be identified by variable slot update system 210 based on the entity type associated with each slot, as well as the intent of the utterance. For instance, certain domains may have a variable slot listed as being associated with a particular intent. When an utterance is received, and the intent associated with the utterance may be determined, and the slot-value pairs associated with that utterance may be determined by NLU processing. Based on a domain of the intent, a determination may be made as to whether a particular entity type is present within the utterance based on the slot(s) from the slot-value pairs. If so, then variable slot update determiner 210 may replace those slots with variable slots, and may attribute the value to the variable slot.

At step 260, a type of update may be determined. Variable slot update system 210 may determine a type of update based on the intent of the utterance, the values of one or more slots, and context associated with the utterance. In some embodiments, the type of update may correspond to one of: appending a value to a variable slot, removing a value from being associated with a variable slot, increasing a value associated with a variable slot by a particular amount, decreasing a value associated with a variable slot by a particular amount, replacing a value associated with a variable slot by another value, and/or performing no update.

At step 262, a response to the utterance may be generated. In some embodiments, response generation system 220 may generate a response based on the utterance. For instance, based on the type of update performed to a variable slot, or slots, different responses may be generated. For example, the utterance "Increase the list by three," may cause an output response to be "Ok. The list now includes five." Response generation system 220 may further determine a type of response to be generated (e.g., audio, text, images, video, etc.). Furthermore, response generation system 220 may also determine whether one or more instructions are to be generated for performing one or more actions (e.g., contacting another system/device). At step 264, the response may be output. For instance, the response may be output by conversation management system 140 to user device 110 via network(s) 120.

FIGS. 3A-E are illustrative diagrams of an exemplary user-conversation management system interaction including dialogue-state updates, in accordance with various embodiments of the present teaching. In the illustrative embodiment of FIG. 3A, a first user-conversation management system interaction, also referred to as a dialogue 300, may be seen. In dialogue 300, user 102 speaks, types, or otherwise inputs a first utterance 302 into user device 110. In the illustrative embodiment, first utterance 302 may be, "Invite Michelle and Nancy for drinks at SoMAR today." Data representing the utterance, whether audio data and/or text data, may be sent to conversation management system 140 to be processed by language understanding system 200.

Language understanding system 200 may identify, using various NLU processing techniques, that utterance 302 is associated with an intent of invitation intent. In this particular example, the invitation intent of utterance 302 may be associated with a restaurant domain, based on the inclusion of "SoMAR," a name of a restaurant, therein. The restaurant domain may include an entity type, "Name," associated with variable slots that can take on a value associated with an identified name or names from an utterance. Thus, NLU may identify slot-value pairs, {Name: "Michelle"} and {Name: "Nancy"}, which variable slot update system 210 may determine correspond to the variable slot associated with the restaurant domain, "PName." Persons of ordinary skill in the art will recognize that any suitable naming mechanism may be employed, and the use of "PName" as the entity name for names within the restaurant domain is merely exemplary.

Variable slot update system 210 may also determine a context of utterance 302. In the illustrative embodiment, the context may be determined based on the various words included within utterance 302. In dialogue 300, the context may indicate that utterance 302 corresponds to an intent to add two individuals, one named "Michelle" and the other named "Nancy," to an invitation. Therefore, in this particular scenario, a type of update 304 to occur to a data object, such as a reservation state (e.g., invitation list, invitation properties), in a data structure 306 is to append the values "Michelle" and "Nancy" to the slot "PName." As seen from dialogue 300, variable slot update determiner 210 may update the slot "PName" within data structure 306 associated with the data object, "Reservation State," such that values "Michelle" and "Nancy" are assigned to the slot "PName" (e.g., {PName: "Michelle," "Nancy"}).

In response to the update performed to data structure 306 based on utterance 302, response generation system 220 may determine a response 308. Response 308, in the illustrative embodiment, may include an utterance—"Excellent choice"—that is to be output by user device 110. In some embodiments, response 308 may be represented as text data, such that text representing response 308 is provided to user device 110 and displayed on a display screen thereof. In another embodiment, response 308 may be represented as audio data, such that audio of response 308 is provided to user device 110 and output by one or more audio output components (e.g., speakers) thereof. In still additional embodiments, response 308 may cause a reservation request to be sent to a system/device associated with a company (e.g., Restaurant "SoMAR") to cause a reservation to be created for user 102. For instance, user device 110 may have user information (e.g., name, email, telephone number, address, etc.) stored thereon within memory, and may send the user information with the data representing utterance 302 to conversation management system 140. Upon determining the intent (e.g., to create a reservation), the user information may be sent to a system/device associated with an endpoint (e.g., restaurant "SoMAR") to create an event for user 102.

In FIG. 3B, another dialogue 310 is presented that occurs subsequent to dialogue 300. In dialogue 310, an utterance 312 is provided by user 102 (e.g., via text, audio, etc.) to conversation management system 140 via user device 110. In the illustrative embodiment, utterance 312 may be, "Actually, Nancy won't be able to make it." Language understanding system 200, upon receipt of data representing utterance 312, may determine that an intent of the utterance is to remove a name from the reservation list, where that name corresponds to "Nancy." In particular, language understanding system 200 may generate the slot-value pair {Name: "Nancy"} with the intent {Intent: "Remove Name"}, which may be provided to variable slot update system 210.

Upon receipt of the slot-value pair, variable slot update system 210 may identify that the domain associated with utterance 312 is still the "Restaurant Domain." Based on the utterance's domain, and the intent associated with the utterance, variable slot update system 210 may determine that a type of update 314 to be performed to the data structure is to remove an entity from the stored list. As seen from FIG. 3A, data structure 306 includes values {Michelle, Nancy} as being associated with slot "PName." Therefore, based on type of update 314, the action that will be performed to data structure 306 will be to remove the value "Nancy" from being associated with the slot "PName." Thus, as seen from data structure 316, slot "PName" is now associated with only the value "Michelle."

In response to the update performed for data structure 316 based on utterance 312, response generation system 220 may determine a response 318. Response 318, in the illustrative embodiment, may include an utterance—"Got it, I removed Nancy from the list"—which is to be output by user device 110. In some embodiments, response 318 may be represented as text data, such that text representing response 318 is provided to user device 110 and displayed on a display screen thereof. In another embodiment, response 318 may be represented as audio data, such that audio of response 318 is provided to user device 110 and output by one or more audio output components (e.g., speakers) thereof. In still additional embodiments, response 318 may cause a reservation request to be sent to a system/device associated with a company (e.g., Restaurant "SoMAR") to cause a reservation to be modified for user 102.

In FIG. 3C, another dialogue 320 between user 102 and conversation management system 140 is described. In dialogue 320, user 102 inputs an utterance 322. Utterance 322, similarly to utterances 302 and 312, may be provided to conversation management system 140. Utterance 322, in the illustrative embodiment, may be "For now, make the reservation for two." Language understanding system 200 of conversation management system 140 may identify that the intent of utterance 322 is to register the number of guests associated with a reservation with the number two (2). Therefore, language understanding system 200 may output the slot-value pair {Number of Guests: "Two"} to variable slot update system 210.

Variable slot update system 210 may identify, based on the intent of utterance 322, and the various other contextual features of utterance 322 (e.g., domain, words, previous utterances, etc.), that the context of utterance 322 is to perform a type of update 324—"Replace." In particular, the restaurant domain may include another variable slot—"RNumGuest"—that may specify a number of values associated with a particular list (e.g., reservation state). In the previous utterances (e.g., utterances 302 and 312), language understanding system 200 did not identify any words within those utterances as being associated with the slot "RNumGuests." On the other hand, in utterance 322, language understanding system 200 may not identify any words as being associated with the slot "PName." Therefore, the type of update 324 for utterance 322, as determined by variable slot update system 210 may be to replace the value currently attributed to the slot "RNumGuest" with the value "2". For example, as seen from updated data structure 326, the slot "PName" has a same value "Michelle" as in data structure 316, but now the slot "RNumGuest" has a value assigned thereto of "2". Previously, there was no value assigned to slot "RNumGuest" as no updates were identified to be performed to that slot from utterances 302 and 312. In response, response generation system 220 may generate and output response 328—"Got it"—to user device 110.

In FIG. 3D, another dialogue 330 between user 102 and conversation management system 140 is illustrated. In dialogue 330, user 102—similarly to utterances 302, 312, and 322, input utterance 332, which in turn is provided to conversation management system 140. Utterance 332, in the example, is, "Add three more guests please." In the illustrative embodiment, language understanding system 200 may identify and output a slot-value pair {Number of Guests: "3"} to variable slot update system 210. In this particular example, however, variable slot update system 210 may determine that the context of utterance 332 is associated with a type of update 334 to adjust (e.g., increase) a value attributed to a corresponding slot. For example, based on the context of utterance 332, variable slot update system 210 may determine that the variable slot "RNumGuest" is to be updated, with the action being to increase the value associated with variable slot "RNumGuest" by the amount "3". Therefore, updated data structure 336 may reflect the new reservation state, whereby slot "PName" has the value "Michelle associated with it, and slot "RNumGuest" has the value "5" associated with it.

The process exhibited in dialogue 330 differs from that of typical NLU processing in that, with typical NLU processing, instead of replacing the value associated with the slot "RNumGuest" with a new value, the value is modified based on the previous value and the new value. For example, standard NLU processing would identify that the intent of utterance 332 is to update the value associated with the entity "Number of Guests," but because the slots from NLU processing are not variable, the value included within utterance 332 would replace the value previously stored within the data structure. Therefore, variable slot update system 210 allows for an accurate dialogue-state between user 102 and conversation management system 140 to be maintained. Conversation management system 140 may then generate and output, via response generation system 220, response 338 to user device 110. Here, response 338 may indicate that the number of guests is now incremented to be five; up from the previous value of two (e.g., "I updated the guest count to 5").

In FIG. 3E, yet another dialogue 340 is illustrated. In dialogue 340, user 102 inputs an utterance 342—"Remove one guest and finalize the reservation." Language understanding system 200 of conversation management system 140 may identify the slot-value pair {Number of Guests: "1"} and {Intent: "Remove"} from utterance 342. Variable slot update system 210 may determine a context of utterance 342 is to perform an update 344 to the number of guests associated with a reservation state. For instance, variable slot update system 210 may determine that the variable slot "RNumGuest" is to be decreased by an amount "1" from its previous value. Therefore, updated data structure 346 may reflect that the new value associated with the variable slot "RNumGuest" is four, as it has been decreased by one from the value associated with the variable slot "RNumGuest" stored with data structure 336. In response, response generation system 220 may generate and output a response 348—"Ok, I reserved a table at SoMAR for 4." Response 348 may then be output to user device 110.

Figure 4A:
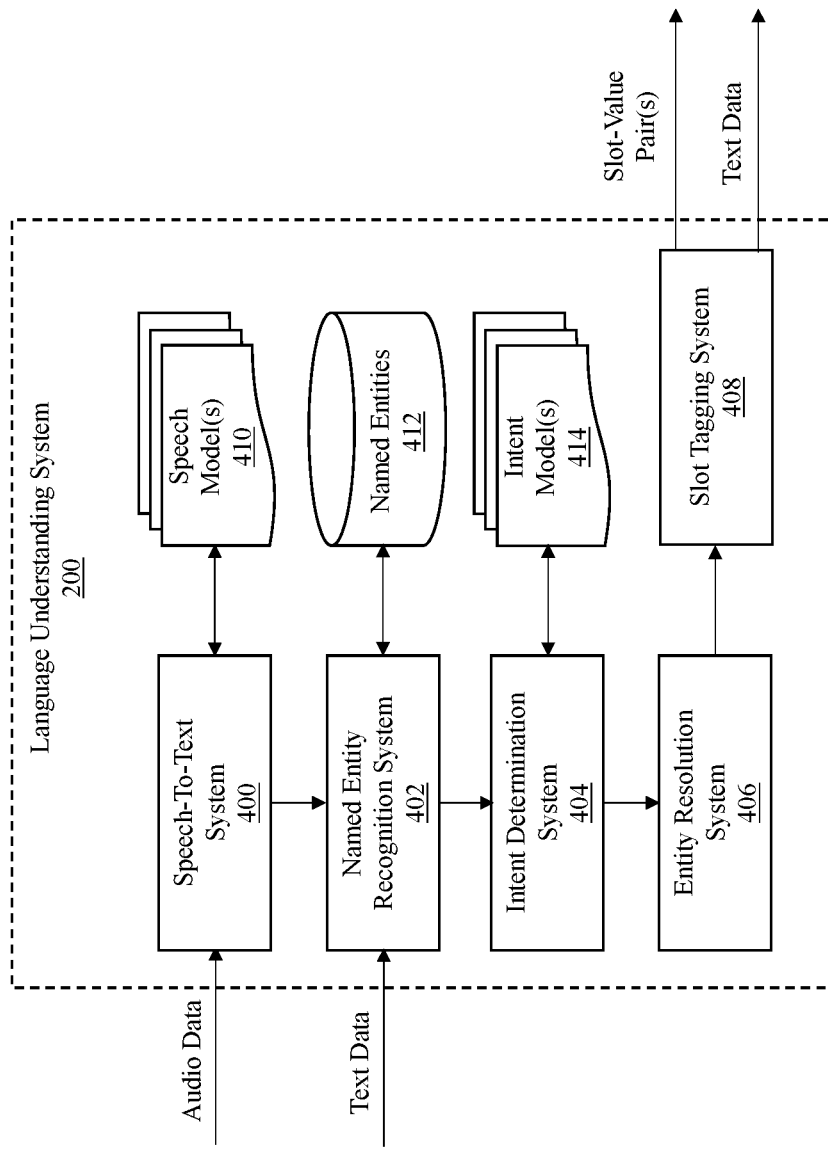
FIG. 4A is an illustrative diagram of an exemplary language understanding system, in accordance with various embodiments of the present teaching.

FIG. 4A is an illustrative diagram of an exemplary language understanding system, in accordance with various embodiments of the present teaching. In the illustrative embodiment, language understanding system 200 may include a speech-to-text ("STT") system 400, a named entity recognition system 402, an intent determination system 404, an entity resolution system 406, and a slot tagging system 408. Each of STT system 400, named entity recognition ("NER") system 402, intent determination system 404, entity resolution ("ER") system 406, and a slot tagging system 408 may include one or more computer programs stored within memory 204 of language understanding system 200, which, upon execution by processor(s) 202 thereof, cause one or more functionalities associated with those components to be performed.

STT system 400, in one embodiment, may receive input audio data—such as via communications platform 206 of language understanding system 200—from user device 110. STT system 400 may employ one or more speech model(s) 410 to generate text data representing the audio data. In some embodiments, STT system 400 may include automatic speech recognition functionality, such as an expression detector that analyzes audio signals. For example, an expression detector may be implemented using keyword spotting technology, which evaluates an audio signal to detect the presence of a predefined word or expression, such as a phrase or other sound data, within the audio signals. The keyword spotter may output a true/false signal representing whether a particular word, series of words, or phrase was uttered. In some embodiments, an expression detector may be configured to analyze the audio signal to produce a score indicating a likelihood that a particular word or phrase is included within the audio data. The expression detector may then compare that score to a threshold value to determine whether that word or phrase will be declared as having been spoken.

STT system 400 may generate words representing the speech of the audio data. STT system 400 may then interpret an utterance based on the similarity between the utterance and pre-established speech model(s) 410. For example, speech models 410 may correspond to models of particular sounds (e.g., sub-word units or phonemes) and sequences of sounds to identify words that match the sounds and/or sequence of sounds uttered within the audio signals of the audio data.

Each audio data may yield multiple instance of text data representing that audio data, where each text data instance may have an associated probability or confidence score representing a likelihood that the text of the text data represents a particular set of words that was uttered. The confidence score may be based on a number of factors. STT system 400 may output the most likely text recognized in the audio data based on the confidence score (e.g., instance of text data having the highest confidence score).

The text data may then be provided to NER system 402 from STT system 400. In the scenario where no audio data is received, but instead text data representing the utterance is received, the text data may instead be provided directly to NER system 402, and STT system 400 may be bypassed.

NER system 402 may receive the text data, either from user device 110 or STT system 400 (or both, if available), and may attempt to identify meaning from the text data. NER system 402 may be in communication with a named entities database 412, which may store listing of entities associated with various domains. A domain, as described herein, may correspond to a set of functionalities having a similar goal/theme/concept. For example, one domain may be for shopping (e.g., the "Shopping Domain"), while another domain may be for restaurants (e.g., the "Restaurant Domain"), and so on. In particular, each domain may be associated with its own language model/gramma database stored within named entities database 412. Therefore, NER system 402 may work to identify which domains an utterance may correspond to, and may output a list of domains that could possible handle a task associated with an utterance, along with a score indicating the likelihood that that domain can perform the task. The list of domains and scores associated with those domains may then be provided to intent determination system 404.

Intent determination system 404, in some embodiments, may analyze the text data, and may determine one or more intents for each identified domain of the list of domains received from NER system 402. As described herein, each domain may include a collection of words associated with intents for that domain. These collections of words may correspond to intent models 414. Intent determination system 404 may serve to identify which potential intents for each domain of the list of domains the utterance may correspond to. For example, the shopping domain may have purchasing intents identifiable by utterances including the word "buy." As another example, the restaurant domain may have reservation intents identifiable by utterances including the word "reservation," or "invite." Intent models 414 process the text data against the intents associated with each domain included within the list of domains to identify one or more "matching" intents.

NER system 402 may be configured to apply relevant language models to interpret an utterance. These language models may specify names of entities (e.g., nouns) found within speech for a particular domain. Intent determination system 404 may then be configured to link the entities to slots, which may also be referred to as fields, or fillable slots/fields, corresponding to a portion of the utterance's text associated with a particular entity. For example, the utterance "Add Jack to the list" may be identified as corresponding to the intent "add a name to a list," this may refer to a sentence structure of the form "Add {Name} to the list."

NER system 402 may also be configured to identify words from an utterance as corresponding to one or more grammatical objects, such as, and without limitations, subject, object, verb, preposition, adverb, adjective, etc. Each intent model 414 may have a domain-specific framework include a listing of slots associated with the various grammatical objects. Each framework may be linked to a particular intent or intents, which may indicate how to interpret the utterance's meaning. Therefore, after intent determination system 404 performs its functions, a resulting intent hypothesis indicating various lexical objects associated with an utterance may be output. For example, using the utterance "Add Jack to the list," may produce a result of: {Domain: "Restaurant"}; {Intent: "Add name to a list"}; {Name: "Jack"}; {List Object: "List"}.

ER system 406 may be configured to associate a particular portion of the text data representing the utterance to an identified entity. For example, ER system 406 may, in some embodiments, identify particular names/values/titles associated with a particular domain as possible objects to resolve to an entity. In particular, ER system 406 may assign a value having a meaning understandable by language understanding system 200 and/or variable slot update system 210 to a particular slot. When ER system 406 identifies a particular value to resolve to an entity, slot tagging system 408 may tag, also referred to herein interchangeably as assign, that value to a particular slot associated with that entity. Continuing the above example, the value "Jack" may be resolved to the entity "Name" within the restaurant domain. Based on the intent being to add a name to a reservation list, ER system 406 may provide instructions to slot tagging system 408 to assign the value "Jack" to the slot "Name." By doing so, a data structure may be generated, or modified, to assign that value to that slot. For example, under the data structure of "Reservation State," generated or linked to the utterance "Add 'Jack' to the list," there may be a variety of fillable slots (e.g., Name Slot, Restaurant Name Slot, Cuisine Slot, Number of Guests Slot, etc.). Slot tagging system 408 may be configured to assign the value "Jack" to the slot "Name" based on ER system 406 resolving the object "Jack" to the entity "Name."

The output result of language understanding system 200 may be slot-value pair data, as well as the text data. The slot-value pair data may represent a list/vector of each slot identified within an utterance, as well as a corresponding value assigned to that slot. These slot-value pairs are the values attributed to particular slots within a data structure representing a data object associated with an intent of the utterance. As an illustrative example, for the utterance "Add 'Jack' to the list," in the context of the restaurant domain, the slot-value pair data may include the slot value pair: {Name: "Jack"}.

Figure 4B:
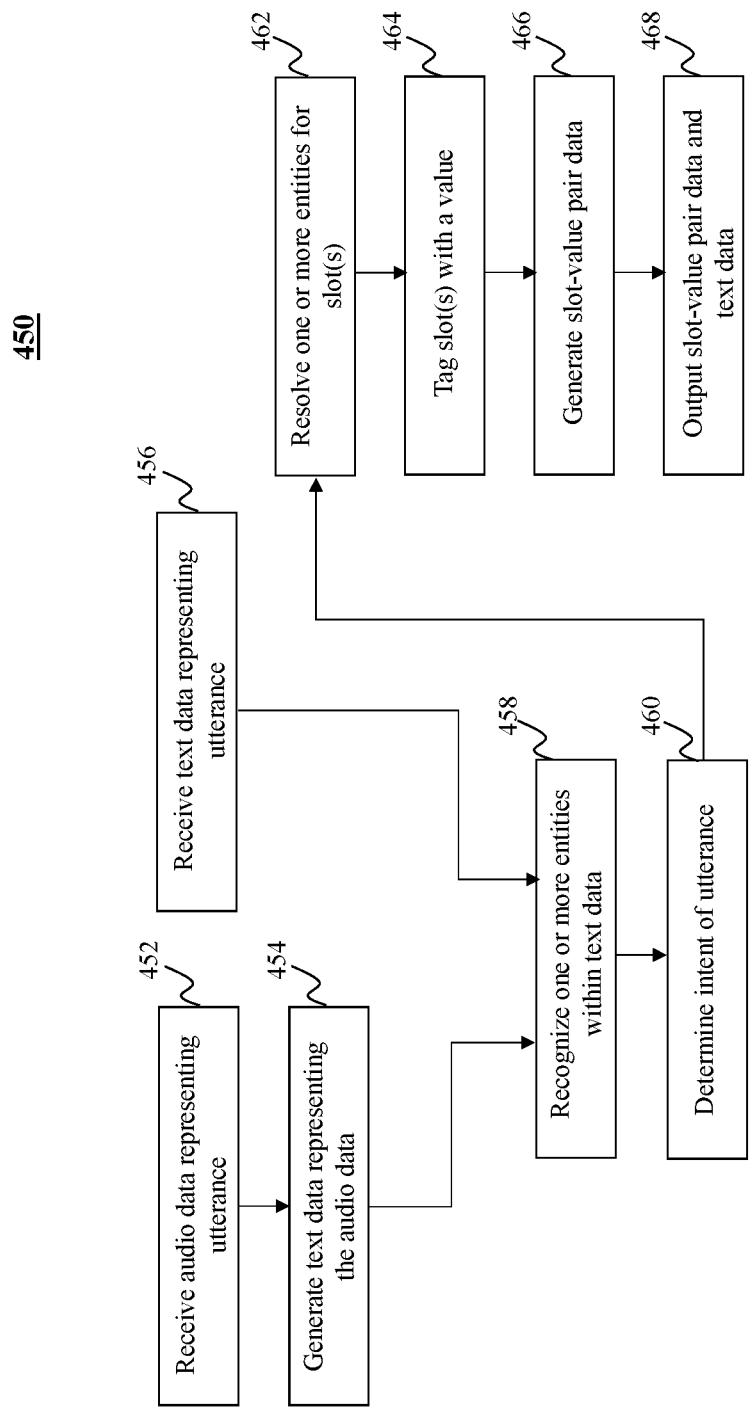
FIG. 4B is an illustrative flowchart of an exemplary process for identifying and outputting slot-value pair data representing one or more slot-value pairs identified from an utterance, in accordance with various embodiments of the present teaching.

FIG. 4B is an illustrative flowchart of an exemplary process for identifying and outputting slot-value pair data representing one or more slot-value pairs identified from an utterance, in accordance with various embodiments of the present teaching. Process 450, in a non-limiting embodiment, may begin at step 452. At step 452, audio data representing an utterance may be received. For example, audio data representing an utterance may be captured by one or more audio input components of user device 110, which in turn may be provided to conversation management system 140 via network(s) 120. At step 454, upon receipt of the audio data, language understanding system 200 may provide the audio data to STT system 400. STT system 400 may generate text data representing the audio data, using one or more speech models 410. In some embodiments, however, process 450 may begin at step 456. At step 456, text data representing the utterance may be received. The text data, for example, may be received by conversation management system 140 from user device 110 via network(s) 120.

After steps 454 and/or 456, process 450 may proceed to step 458. At step 458, one or more entities may be recognized within the text data. For example, NER system 402 may recognize one or more entities within the utterance by parsing the utterance using one or more grammatical models stored within named entities database 412. Named entities database 412 may store representations of varies entities (e.g., nouns) associated with different intents.

At step 460, an intent of the utterance may be determined. The intent may be determined using intent determination system 404 employing intent model(s) 414. In some embodiments, a verb or other grammatical object may be identified within the utterance to indicate a corresponding intent. For example, the verb "play" may be associated with an intent to play music, play videos, and/or play a game. In some embodiments, one or more intent hypotheses may be output for the utterance, each having its own score indicating how likely it is that that intent corresponds to the utterance. The intent of the utterance, for instance, may be selected based on which intent has the highest score. However, in other instance, entity resolution may be performed prior to the intent being selected.

At step 462, one or more entities may resolved to a slot for the determined intent. For instance, each intent from each domain may have a sentence framework modeling the utterance. The sentence frameworks may include varies fillable slots associated with the different entities for that intent and domain. ER system 406 may be configured to resolve a value to a slot based on the named entities stored within named entities database 414 and the words included within the received utterance.

At step 464, one or more slots within the sentence framework may be tagged with a value based on the utterance's words. For example, the utterance, "Add 'Jack' to the reservation" may be associated with a sentence framework, "Add {Name} to the {List}," where {Name} and {List} correspond to slots within a restaurant domain. In this particular scenario, ER system 406 and slot tagging system 408 may work to assign the value "Jack" to the slot "Name," and the value "Reservation" to the slot "List," or "List Type."

At step 466, slot-value pair data may be generated. The slot-value pair data may include a listing/vector of all of the slots and their assigned values identified for a particular utterance. As seen from the previous example, language understanding system 200 may generate slot-value pair data including the slot-value pair {Name: "Jack"}. At step 468, the slot-value pair data and the text data may be output. For example, language understanding system 200 may output the slot-value pair data to variable slot update system 210.

Figure 5A:
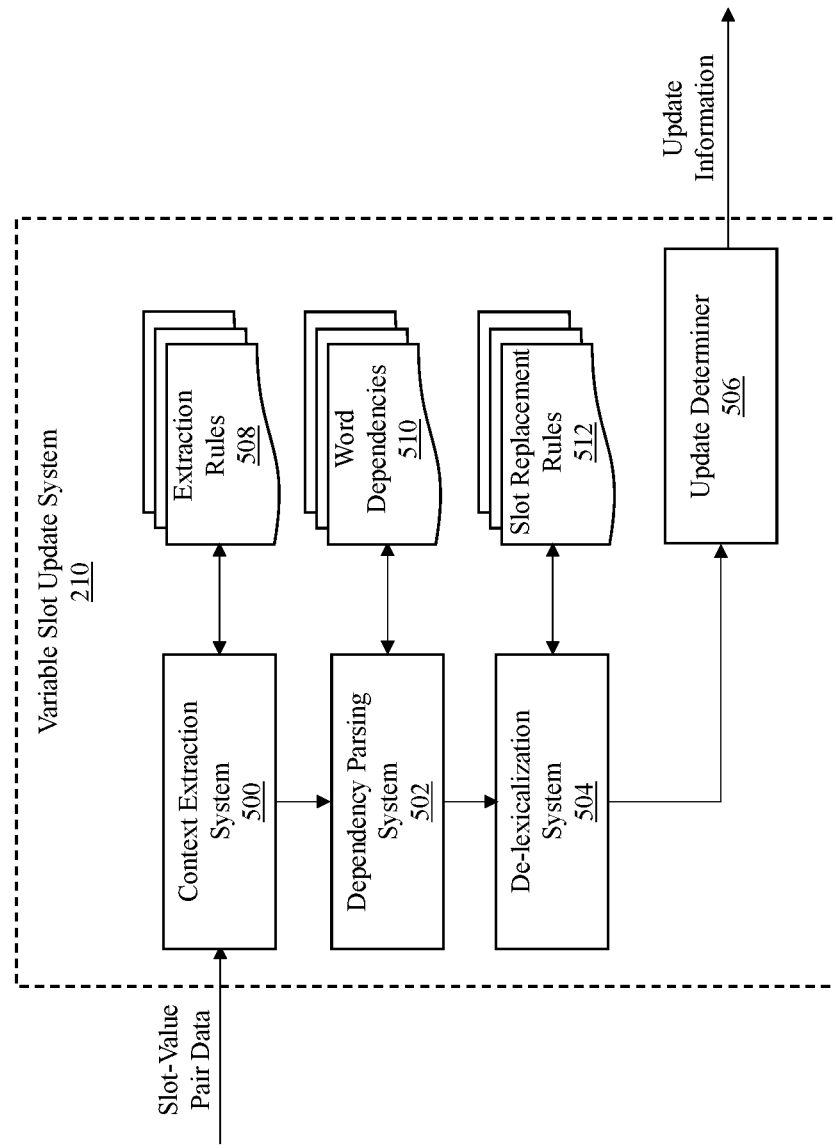
FIG. 5A is an illustrative diagram of an exemplary variable slot update system, in accordance with various embodiments of the present teaching.

FIG. 5A is an illustrative diagram of an exemplary variable slot update system, in accordance with various embodiments of the present teaching. In the illustrative embodiment, variable slot update system 210 may include a context extraction system 500, a dependency parsing system 502, a de-lexicalization system 504, and an update determiner 506.

Each of context extraction system 500, dependency parsing system 502, de-lexicalization system 504, and update determiner 506 may include one or more computer programs stored within memory 204 of variable slot update system 210, which, upon execution by processor(s) 202 thereof, cause one or more functionalities associated with those components to be performed.

Context extraction system 500, in some embodiments, may be configured to receive the slot-value pair data and the text data from language understanding system 200, and extract a context of the utterance. Each utterance received may include one or more slots, each having one or more values associated therewith. Therefore, multiple updates may be needed, and so an understanding of an appropriate context for those values is needed to properly manage a dialogue state between user device 110 operated by user 102, and conversation management system 140. A context for a particular slot value, as described herein, may correspond to an ordered set of words representative of an update to be performed to/for that value.

As an illustrative example, the utterance "Remove 'John' but add 'Jay' to the list," may include two values, "John" and "Jay," for the slot "Name." In particular, if this slot is a variable slot, such as a multi-value slot associated with the restaurant domain, then the slot may correspond to a "PName" slot. However, the update to be performed may differ depending on the subject, "John" or "Jay." For instance, the update associated with the subject "John" may be to remove (e.g., removing update) from the list, while the update associated with the subject "Jay" may be to add (e.g., adding/appending update) to the list. In this particular example, the "context" from the utterance needs to be properly distributed to the right subject in order to perform the correct action. For instance, the context of "Remove" needs to be linked to the subject "John," while the context of "Add" or "Append" needs to be linked to the subject "Jay."

In some embodiments, context extraction system 500 may employ one or more extraction rules 508 to perform the extraction. For example, extraction rules 508 may include instructions executable by processor(s) 202 of variable slot update system 210 to facilitate use of a sliding window to analyze the words surrounding a particular slot. Extraction rules 508 may indicate how context extraction system 500 is to analyze certain words within an utterance based on their position (e.g., within a sentence) and relationship to a given slot or slots.

Dependency parsing system 502 may be configured to parse a sentence to identify the grammatical relationships between each word in the sentence and one or more other words in the sentence. For example, dependency parsing system 502 may employ word dependencies 510 to identify the objects within an utterance, the action associated with the utterance, the nominal subject of the utterance, the direct object of the utterance, and/or the nominal passive subject of the utterance. These contextual dependencies may be particularly useful in the scenario where the sliding window approach of context extraction system 500 does not yield results, yields incorrect results, and/or as a crosscheck for context extraction system 500.

De-lexicalization system 504 may be configured, in some embodiments, to remove the lexical properties of text to obtain a canonical form of that text. Various types of de-lexicalization may include, but are not limited to, stemming and lemmatization. De-lexicalization system 504 may employ one or more slot replacement rules 512 to de-lexicalize the slot-value pairs received from language understanding system 200, and replace them with the type of variable slot that with they belong. After identifying the variable slot or slots, the replacement information may be used to replace the slots with their corresponding variable slot. As an illustrative example, the utterance, "Add Jack and John to the invitation" may be changed to "Add {Multi-Value Slot} and {Multi-Value Slot} to the invitation."

Update determiner 506, in one embodiment, may be configured to receive the replacement information, dependency parsing information, and context extraction information and determine a type of update to be performed. As mentioned previously, update determiner 506 may classify the utterance into being associated with one or more types of updates. The various types of updates may include, in the illustrative example, appending, removing, increasing, decreasing, replacing, and performing no update.

Figure 5B:
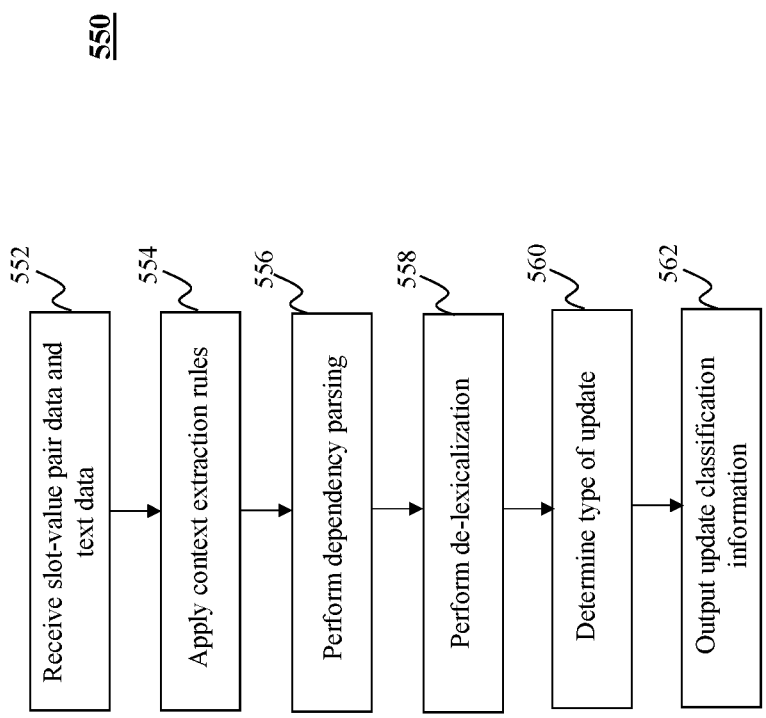
FIG. 5B is an illustrative flowchart of an exemplary process for determining update classification information for a slot-value pair, in accordance with various embodiments of the present teaching.

FIG. 5B is an illustrative flowchart of an exemplary process for determining update classification information for a slot-value pair, in accordance with various embodiments of the present teaching. Process 550 of FIG. 5B may, in a non-limiting embodiment, begin at step 552. At step 552, slot-value pair data and the text data may be received. For instance, slot-value pair data representing one or more slot-value pairs identified from an utterance may be received by variable slot update system 210 from language understanding system 200.

At step 552, one or more context extraction rules may be applied to the text data representing the utterance. For example, a sliding window may be applied that analyzes the words surrounding a given slot, identified form the slot-value pair data, to determine the words surrounding that slot. These words may be analyzed to determine whether they contribute—if any—to the context of the slot. In some embodiments, context extraction system 500 may apply one or more context extraction rules 508 to the text data using the slot-value pair data.

At step 556, dependency parsing may be applied to the text data. For instance, dependency parsing system 502 may employ word dependencies 510 to identify a grammatical dependency of each word within an utterance. For example, the objects, subjects, actions, and so on, of each utterance may be identified and labeled by dependency parsing system 502.

At step 558, de-lexicalization may be performed to the text data. For instance, de-lexicalization system 504 may analyze the utterance and, using the slot-value pair data, may identify the variable slots present within the utterance. In some embodiments, de-lexicalization system 504 may use slot replacement rules 512 to replace one or more slots with a corresponding variable slot (e.g., a multi-value slot and/or an adjustable slot).

At step 560, a type of update to be performed for the utterance may be determined. For instance, update determiner 506 may classify the utterance as being associated with one or more types of updates: appending, removing, increasing, decreasing, replacing, and performing no update. Depending on the context, and the sentence structure, slot replacements, and dependencies, the type of update may be classified for a particular utterance. At step 562, update classification information, indicating a type of update to be performed, may be output from variable slot output system 210.

Figure 6A:
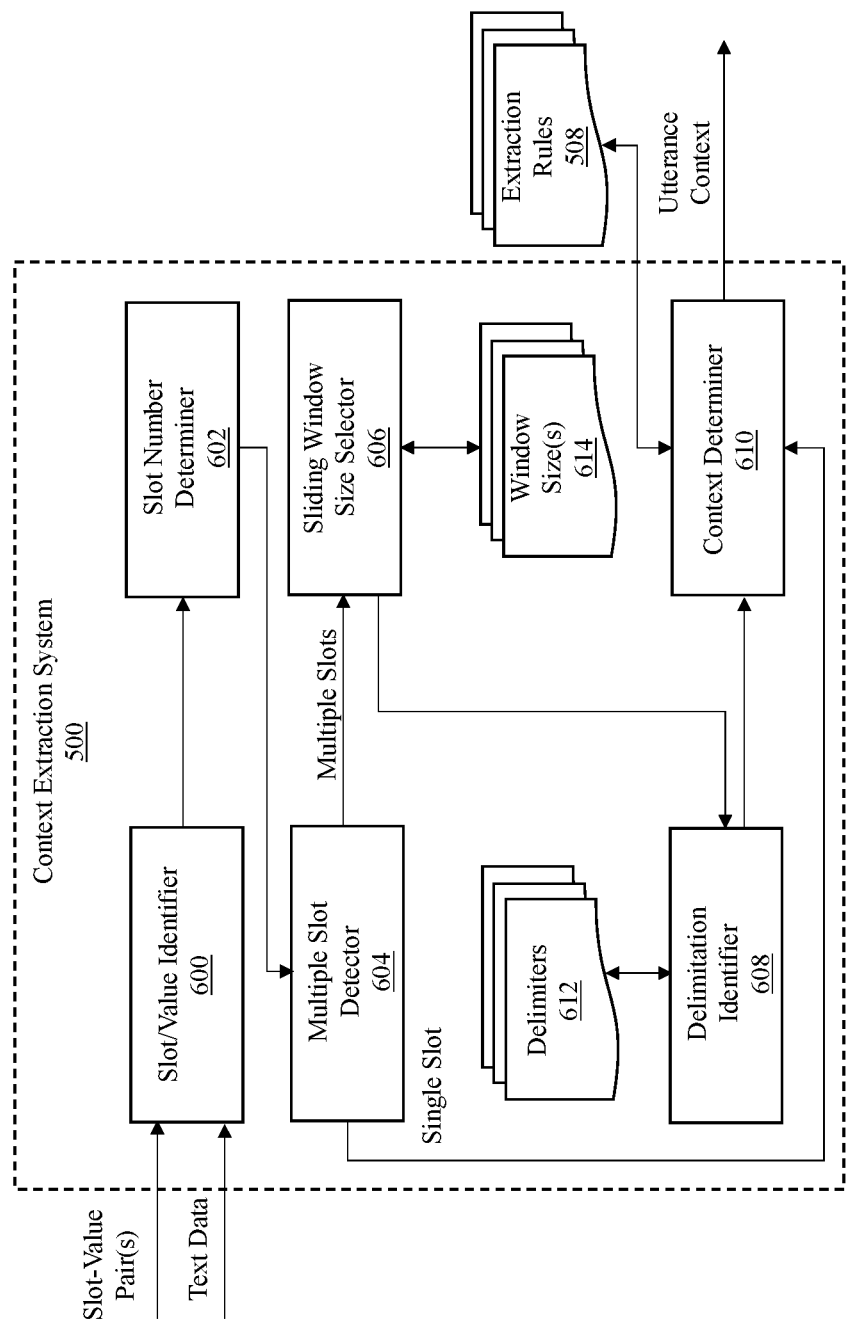
FIG. 6A is an illustrative diagram of an exemplary context extraction system, in accordance with various embodiments of the present teaching.

FIG. 6A is an illustrative diagram of an exemplary context extraction system, in accordance with various embodiments of the present teaching. Context extraction system 500, in the illustrative embodiment, may include a slot/value identifier 600, a slot number determiner 602, a multiple slot detector 604, a sliding window size selector 606, a delimitation identifier 608, and a context determiner 610. Each of slot/value identifier 600, slot number determiner 602, multiple slot detector 604, sliding window size selector 606, delimitation identifier 608, and context determiner 610 may include one or more computer programs stored within memory 204 of variable slot update system 210, which, upon execution by processor(s) 202 thereof, cause one or more functionalities associated with those components to be performed.

Slot/value identifier 600, in the illustrative embodiment, may receive slot-value pair data, as well as text data representing an utterance, from language understanding system 200. Upon receiving the slot-value pair data, slot/value identifier 600 may be configured to identify the various slots and their corresponding values within a given utterance, as represented by the additionally received text data. For instance, the utterance, "Remove John and add Jay to the list" may be received, or in particular, text data representing this utterance may be received, and an identification of two instances of the slot "Name" (e.g., {Name}) may be identified. The two instances may have two different values, one associated with the value "John," and the other associated with the value "Jay."

The slot/value pair data, and identified slots, may be provided to slot number determiner 602. Slot number determiner 602 may be configured to determiner a number of slots present within the utterance. Using the previous example, slot number identifier 602 may determine that there are two slots associated with the slot "Name." The number of slots that are determined to be present, along with the slot-value pair data and the text data may then be provided to multiple slot detector 604. Multiple slot detector 604 may, in some embodiments, function to determine whether there are two or more slots present within an utterance. Depending on the number of slots detected by slot number determiner 602, multiple slot detector 604 may be configured to pass the slot-value pair data, the text data, and/or any additionally information capable of being used to determine a context of the utterance, to sliding window size selector 606 or context determiner 610.

As described in greater detail below with reference to FIG. 7A, if only one slot is detected within the utterance, multiple slot detector 604 may provide the text data and the slot-value pair data to context determiner 610. Context determiner 610, in this particular scenario, may employ one or more extraction rules 508 to determine the context of the utterance. For example, if only one slot is identified within the utterance, then all of the words included for the utterance may be used by context determiner 610 to determine the context of the utterance.

If, however, multiple slot detector 604 determines that the number of slots presented within the utterance, as determined by slot number determiner 602, is greater than one, then the slot-value pair data, the text data, and any other suitable information for identifying an utterance's context, may be provided to sliding window size selector 606. Sliding window size selector 606 may be configured to select a window size from one or more preconfigured window sizes 614 to be used for a sliding window. The sliding window may analyze words adjacent to each identified slot within that window to extract a context associated with a particular slot. For example, the selected window may have a value of k=2, such that a sliding window of 2 words around a given slot's value from an utterance may be analyzed when determining a context associated with that vale.

Delimitation identifier 608 may identify one or more delimiters 612 present—if any—within an utterance. A delimiter, as described herein, may correspond to any grammatical object that implies a relationship/connection between one slot and various values. For example, the utterance "Add Jay, John, and Jack to the list," implies that the values "Jay," "John," and "Jack" are all associated with the action "Add." The values "Jay," "John," and "Jack," in this example, may be segmented by commas as well as the word "and." Therefore, delimitation identifier 608 may identify whether the utterance includes any delimiters 612, and further whether those delimiters constitute a connection between an action and two or more values.

The sliding window size that is selected, the delimiter information, the slot-value pair data, and the text data may then be provided to context determiner 610 to determine a context associated with each value, and more generally, the utterance. In some embodiments, context determiner 610 may employ extraction rules 508 to determine the context, and context determiner 610 may output the utterance's context from context extraction system 500. The various ways by which context determiner 610 may determine context is described in greater detail below with reference to FIG. 7A.

Figure 6B:
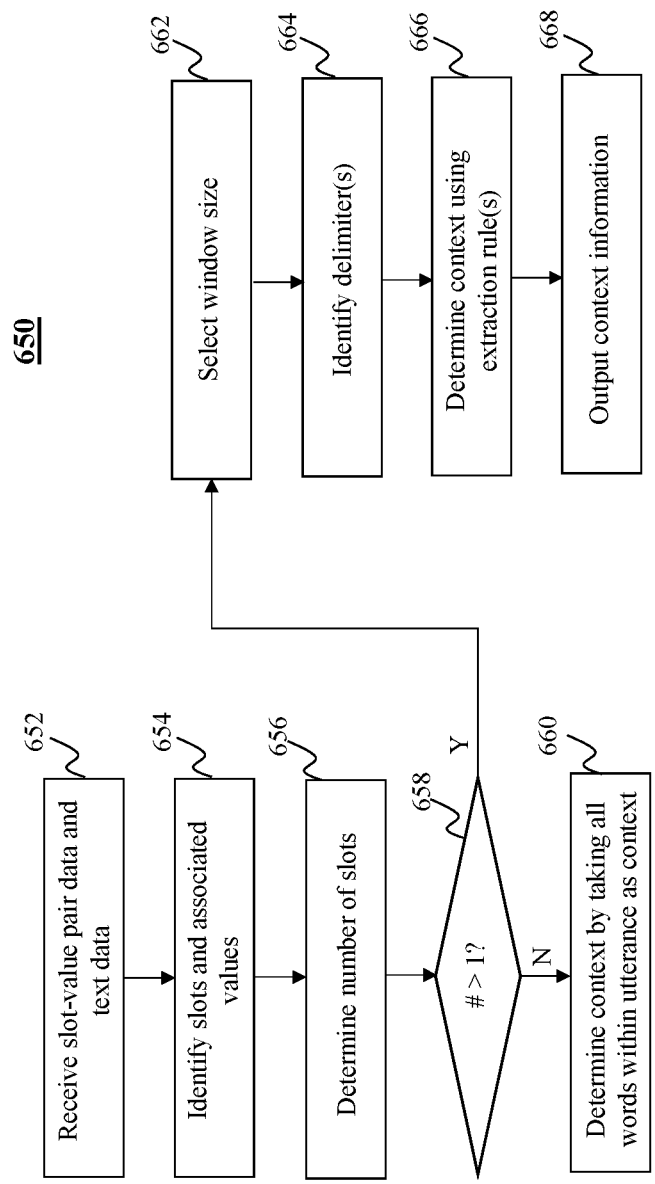
FIG. 6B is an illustrative flowchart of an exemplary process for determining an utterance's context, in accordance with various embodiments of the present teaching.

FIG. 6B is an illustrative flowchart of an exemplary process for determining an utterance's context, in accordance with various embodiments of the present teaching. Process 650, in a non-limiting embodiment, may begin at step 652. At step 652, slot-value pair data and text data may be received from language understanding system 200. At step 654, the slots and the associated values associated with the utterance may be identified. For example, slot/value identifier 600 may determine the slots/values from the slot-value pair data and/or the text data (e.g., the text data may be analyzed separately and/or additionally).

At step 656, a number of slots present within the utterance may be determined. For example, slot number determiner 602 may count the number of slots present within the utterance using the text data and/or the slot-value pair data. At step 658, a determination may be made as to whether the utterance includes more than one slot. For example, multiple slot detector 604 may determine whether the number of slots is greater than one. If, at step 658, multiple slot detector 604 determines that there is not more than one slot within the utterance, and therefore there is only a single slot, then process 650 may proceed to step 660. At step 660, a context of the utterance may be determined by context determiner 610. In particular, for a single slot utterance, all of the words within the utterance may be taken to determine the context of a corresponding slot's utterance.

If, however, at step 658, multiple slot detector 604 determines that there are more than one slot present within the utterance, then process 650 may proceed to step 662. At step 662, a window size for a sliding window to be used for analyzing the utterance may be selected. For example, sliding window size selector 606 may select one of window size(s) 614 to use for a sliding window to be used by context determiner 610 to analyze an utterance's context. At step 664, one or more delimiters, if present within the utterance, may be identified. For instance, delimitation identifier 608 may be configured to identify one or more delimiters 612 (e.g., commas, semi-colons, hyphens, conjunctions, etc.) within an utterance.

At step 666, a context for a value associated with each slot of the two or more slots identified within the utterance may be determined. For instance, context determiner 610 may employ one or more extraction rules 508 to determine a context associated with that value based, at least in part, on the selected sliding window size and/or the delimiter information. At step 668, the context information, indicating a context of the value associated with each slot, and thus associated with the utterance, may be output from context extraction system 500.

Figure 7A:
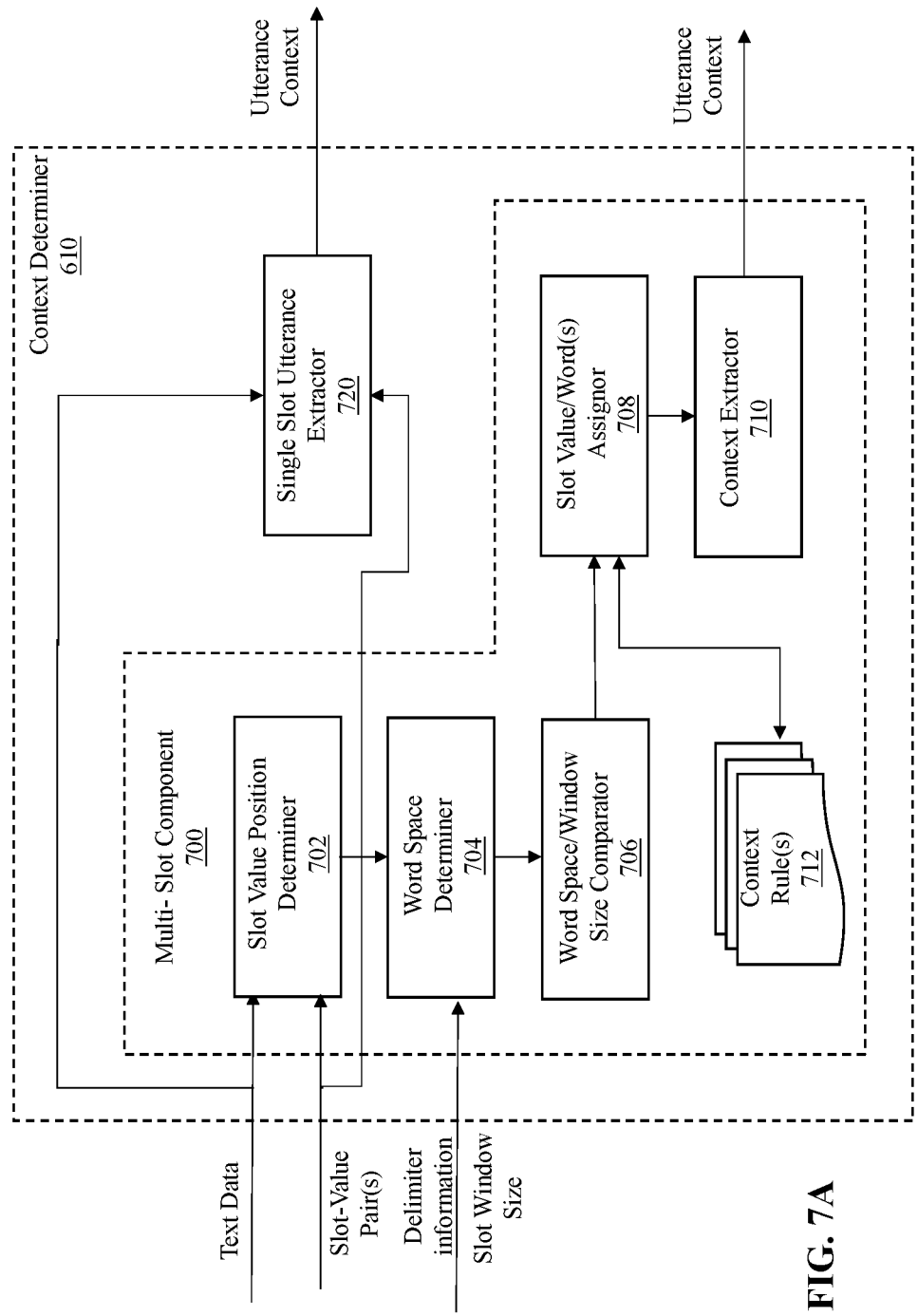
FIG. 7A is an illustrative diagram of an exemplary context determiner, in accordance with various embodiments of the present teaching.

FIG. 7A is an illustrative diagram of an exemplary context determiner, in accordance with various embodiments of the present teaching. Context determiner 610, in the illustrative embodiment, may include a multi-slot component 700 and a single slot utterance extractor 720. Multi-slot component 700 may be operable to determine a context for an utterance including multiple slots. Single slot utterance extractor 720 may be configured to determine a context of an utterance including only a single slot. In some embodiments, if no slots are identified, additional processing of the utterance may be required. Multi-slot component 700, in the illustrative embodiment, may include a slot value position determiner 702, a word space determiner 704, a word space/window size comparator 706, a slot value/word(s) assignor 708, and a context extractor 710. Each of slot value position determiner 702, a word space determiner 704, a word space/window size comparator 706, a slot value/word(s) assignor 708, and a context extractor 710, as well as single slot utterance extractor 720, may include one or more computer programs stored within memory 204 of variable slot update system 210, which, upon execution by processor(s) 202 thereof, cause one or more functionalities associated with those components to be performed.

Single slot utterance extractor 720 may, in one embodiment, be configured to determine a context of an utterance including only a single slot. Single slot utterance extractor 720 may receive the text data representing the utterance, as well as the slot-value pair data. In one embodiment, single slot utterance extractor 720 may be configured to take the entire utterance as the context for that single slot's value. For example, if the utterance is, "Add John," then all the words of the utterance surrounding slot "Name" having the associated the value "John" may be used to determine the context of the utterance. Single slot utterance extractor 720 may then output the utterance's context from context determiner 610.

Multi-slot component 700, and the various components and functions associated therewith, may be employed in the scenario where multiple slot detector 604 identifies two or more slots present within an utterance. In this embodiment, the text data and the slot-value pair data may also be received by slot value position determiner 702. Slot value position determiner 702 may be configured to determine a syntax position of each word within the utterance, and in particular, the position of each slot's value within the utterance. For example, each slot value's position within the utterance (e.g., first word, second word, n-th word) may be determined. Slot value position determiner 702 may then provide the positional information to word space determiner 704.

Word space determiner 704 may receive the slot value positional information from slot value position determiner 702, as well as the delimiter information and selected slot window size from delimitation identifier 608 and sliding window size select 606, respectively. Word space determiner 704 may then be configured to determine a number of words, also referred to as a word spacing, between each slot value. For example, the utterance, "Add John to the list, but remove Jack" may indicate that between the slot values "John" and "Jack," there are five words. Some of those words may correspond to additional actions and/or contexts, and may not be applicable to both slot values, however word space determiner 704 may first determiner the absolute number of words. In some embodiments, word space determiner 704 may also identify the number of words unrelated to an action or additional slot, such as the word "list" or "remove" from the previous example utterance.

The number of words between slot values may then be provided to word space/window size comparator 706 to determine whether the number of words is greater than or equal to the selected sliding window size. For example, if the window size is k=2, then comparator 706 may determine whether the number of words between the slot values is less than or equal to the window size, or some multiple of the window size. For instance, the different context rules 712 may be used depending on the word spacing in relation to the window size.

Slot value/word(s) assignor 708 may be configured to apply one or more context rule(s) 712 to the words adjacent to a slot value in order for context extractor 710 to extract a context. For example, slot value/word(s) assignor 708 may determine whether the number of words between two (or more) slots is less than 2 k (e.g., n<2 k). In this particular scenario, context rule(s) 712 may specify that the k words are to be assigned to the context of the "right" slot's value, while the n−k words are assigned to the context of the "left" slot's value. Furthermore, context rule(s) 712 may specify that all the words to the "left" (e.g., prior" to the first value may be added to the first value's context, while all the words to the right of the right value may be added to the second value's context. As an illustrative example, the utterance "Add Jack and remove Bob" indicate that, because there are less than 2 k words between the values "Jack" and "Bob" (e.g., 2<2 (2)), then the value "Bob" will have the words "and" and "remove" assigned to it for determining the context associated with the value "Bob," while the word "Add" will be assigned to the context associated with the value "Jack."

As another illustrative example, in the case of delimiters being present, such as commas, spaces, colons, the word "and," etc., the values of the same slot connected by those delimiters may be combined into a single value. For example, the utterance "Add Jack, John, and Jay to the invite" be decomposed such that the values "Jack," "John," and "Jay" are treated as one value, and context segmentation is not performed between those values. This is because these values are connected by the delimiters, and thus have a same type of update being applied thereto.

Figure 7B:
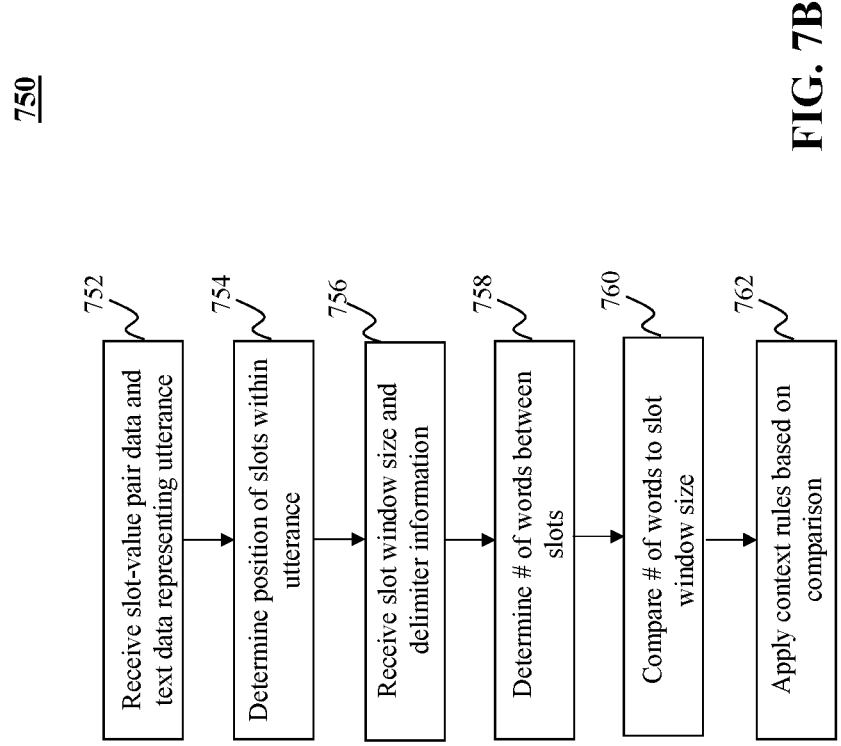
FIG. 7B is an illustrative flowchart of an exemplary process for applying one or more context rules, in accordance with various embodiments of the present teaching.

FIG. 7B is an illustrative flowchart of an exemplary process for applying one or more context rules, in accordance with various embodiments of the present teaching. Process 750, in a non-limiting embodiment, may begin at step 752. At step 752, slot-value pair data and text data representing an utterance may be received. For example, in the case of multi-slot component 700, the data may be received by slot value position determiner 702. At step 754, a position of each slot, and thus each slot's corresponding value, may be determined. For instance, slot value position determiner 702 may determine the location of each slot and value within the utterance. In some embodiments, the slot-value pair data may include this information.

At step 756, a slot window size and delimiter information may be received. For example, the sliding window size selected by sliding window size selector 606, and the identified delimiter information from delimitation identifier 608, may be received by word space determiner 704. Additionally, word space determiner 704 may also receive the slot/value position information from slot value position determiner 702.

At step 758, a number of words between the various slots—if there are multiple slots present within the utterance—may be determined. In the scenario where only a single slot is present, single slot utterance extractor 720 may be employed. Word space determiner 704 may be configured, in some embodiments, to determine the number of words present between each slot's value within the utterance. At step 760, the number of words may be compared to the selected slot window size. For example, word space/window size comparator 706 may compare the number of words between two or more slot values with the selected sliding window's size. Then, at step 762, the one or more context rules may be applied based on the results of the comparison. For example, slot value/word(s) assignor 708 may apply context rules 712 to determine which words to assign to which slot value in order to extract a context of the value, and thus the utterance, using context extractor 710.

Figure 8A:
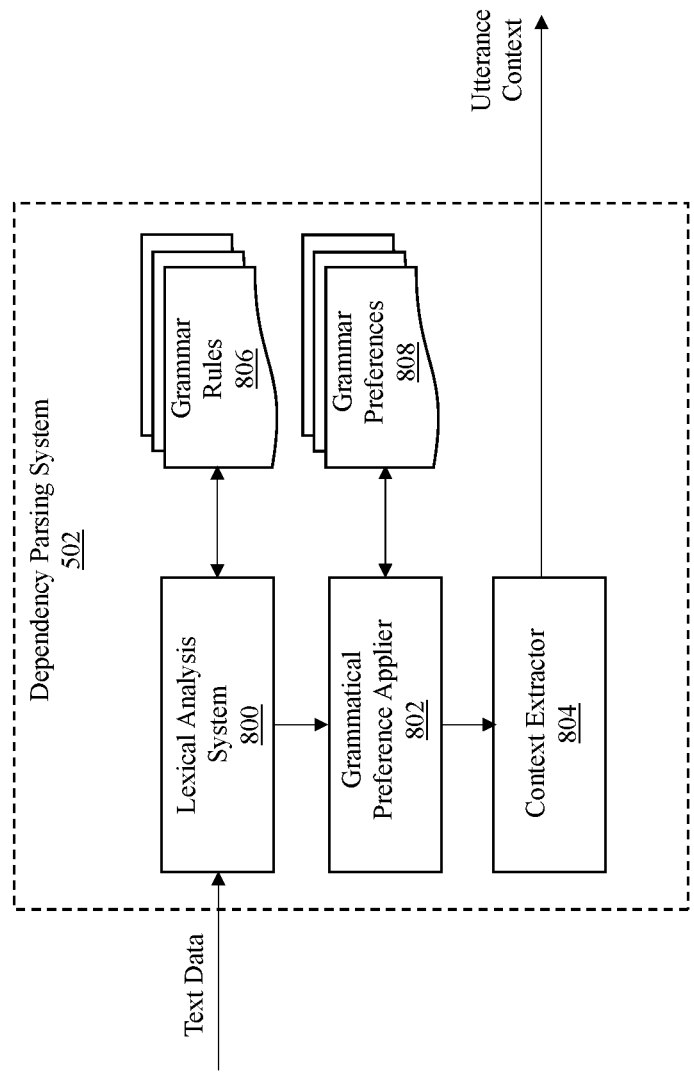
FIG. 8A is an illustrative diagram of an exemplary dependency parsing system, in accordance with various embodiments of the present teaching.

FIG. 8A is an illustrative diagram of an exemplary dependency parsing system, in accordance with various embodiments of the present teaching. In the illustrative embodiment, dependency parsing system 502 may include a lexical analysis system 800, a grammatical preference applier 802, and a context extractor 804. Each of lexical analysis system 800, grammatical preference applier 802, and context extractor 804 may include one or more computer programs stored within memory 204 of variable slot update system 210, which, upon execution by processor(s) 202 thereof, cause one or more functionalities associated with those components to be performed.

Lexical analysis system 800, in the illustrative embodiment, may be configured to apply one or more grammar rules 806 to text data representing the utterance in order to determine a grammatical relationship between the various utterance's words. Grammar rules 806 may assist in determining how certain words are effected, or affect, other words within the utterance. As an illustrative example, the utterance, "John added Jack to the list," may be analyzed by lexical analysis system 800 using grammar rules 806 to determine that the action "add" or "added" is linked to both values "John" and "Jack." The relationship between the action and the values is, in the example, that "John" is the actor having a nominal subject dependence to the action "added," while "Jack" is the actor being affected by the action with a direct object dependency. Grammar rules 806 may specify criteria by which to classify the values into one of three dependencies: nominal subject, direct object, and nominal passive subject. When context extractor 804 performs context extraction, the identified dependencies are used to add the words connected with a particular slot-value pair to that slot value's context. The nominal subject, as described herein, may correspond to a noun phrase that is the syntactic subject of a clause. The direct object, as described herein, may correspond to the noun phrase that is the object of the verb. The nominal passive subject, as described herein, may be a noun phrase that is the syntactic subject of a passive clause.

Grammatical preference applier 802 may be configured to apply one or more grammar preferences 808 to assist in identifying context. In some embodiments, grammatical preference applier 802, and more generally dependency parsing system 502, may be employed to assist in identifying context when/if the sliding window technique describe previously with respect to context extraction system 500 does not work or produces inaccurate results.

One such illustrative example where grammatical preference applier 802 may be employed is when context extraction system 500 is unable to capture related words using the sliding window. For instance, if a word or words related to a value are not located within the sliding window, then the sliding window may not attribute these words to a values context. To remedy this situation, grammar preference applier 802 may identify the grammatical relationship between objects and actions to capture the words for context extrication in relation to a particular value. As an illustrative example, for the utterance "John is to be removed so take one person off the list." In this utterance, the action "removed" is outside of the window having a window size k=2 of the value "John" associated with the slot "Name." Therefore, because John is the subject of the action "removed," grammatical preference applier 802 may recognize that the action "remove" or "removed" is to be associated with the value "John."

As another illustrative example where grammatical preferences applier 802 may be employed is when context extraction system 500 captures one or more unrelated words using the sliding window technique. For instance, certain words included within the sliding window may be unconnected, grammatically, to a slot value. Therefore, grammatical preferences applier 802, employing grammatical preferences 808, may be capable of resolving this situation. For example, the utterance "John said Jack is not coming," may, using the sliding window technique, attribute the action "said" to the context of value "Jack," whereas "said" is actually grammatically connected to the value "John."

Grammatical preferences 808, when applied using grammatical preferences applier 802, may further indicate to context extractor 804 that, when a word is connected to multiple slot-values, preference may be given to the word having direct object dependency as compared to a word having nominal subject and nominal passive subject dependencies. For instance, the direct object of a verb/action is the recipient of that action. Therefore, the direct object is the more likely attributer for the context of the action.

Context extractor 804, may therefore, receive all of the contextual preferences as applied by grammatical preference applier 802, and may identify and extract a context for each value based on those rules. Context extractor 804 may then output the utterance's context, either in total or for each slot's value. For example, each slot-value pair may have a context extracted by context extractor 804 using grammatical preferences 808 applied by grammatical preference applier 802. Context extractor 804 may then output contextual slot-value pair data indicating the various slot-value pairs as well as the context associated therewith.

FIG. 8B is an illustrative flowchart of an exemplary process for extracting a content of an utterance, in accordance with various embodiments of the present teaching. Process 850, in a non-limiting embodiment, may begin at step 852. At step 852, text data may be received. For instance, text data representing an utterance may be received by dependency parsing system 502, and in particular by lexical analysis system 800. At step 854, lexical analysis may be performed to the text data using one or more grammar rules. For example, lexical analysis system 800 may apply grammar rule(s) 806 to the text data. At step 856, grammatical dependencies of the words within an utterance may be determined. For instance, lexical analysis system 800 may perform lexical analysis using grammar rule(s) 806 to identify a grammatical dependency associated with each word in the utterance. The grammatical dependencies may include, for example, nominal subjects, direct objects, and nominal passive subjects. Additionally, an action/verb may also be identified.

At step 858, one or more grammatical preferences may be applied. For example, grammar preferences 808 may be applied to the words in the utterance, based on the grammatical dependencies, using grammatical preference applier 802. At step 860, the context of the utterance may be extracted. For example, context extractor 804 may extract the context of a value, or values, within an utterance based on the grammar preferences applied to the words and grammatical dependencies associated with at least some of those words. At step 862, the utterance's context may be output from dependency parsing system 502.

Figure 9A:
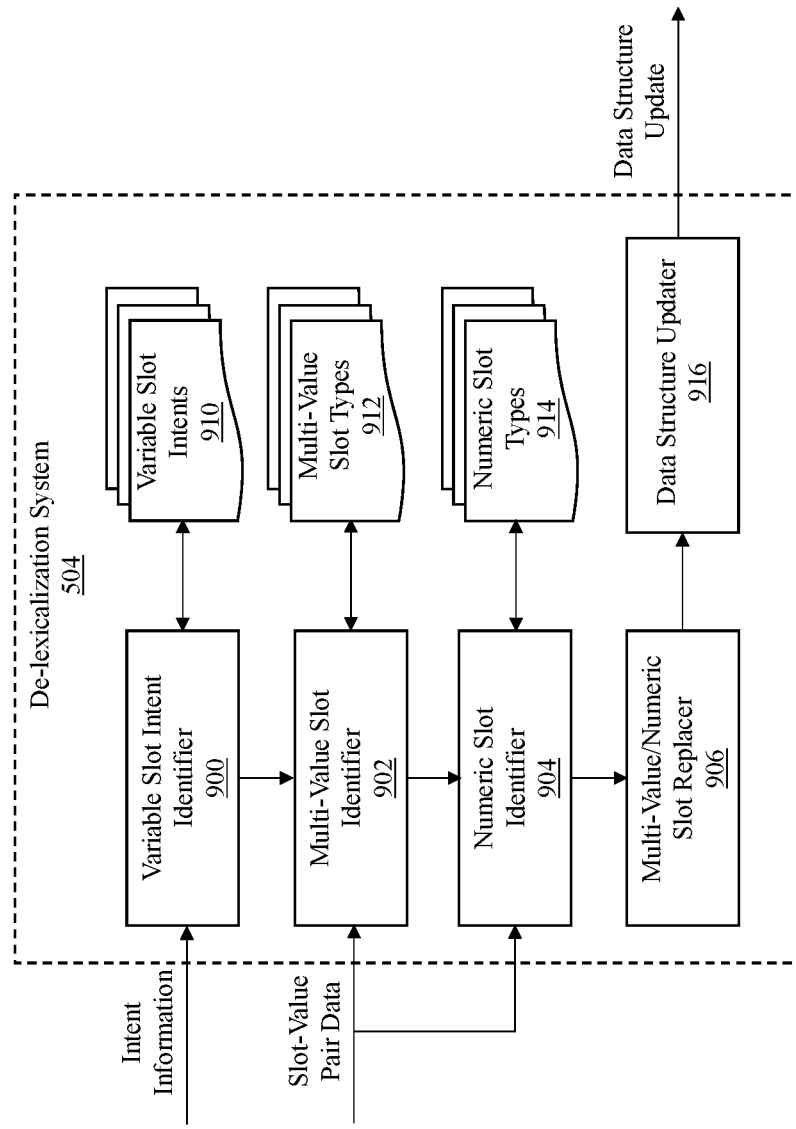
FIG. 9A is an illustrative diagram of an exemplary de-lexicalization system, in accordance with various embodiments of the present teaching.

FIG. 9A is an illustrative diagram of an exemplary de-lexicalization system, in accordance with various embodiments of the present teaching. De-lexicalization system 504, in the illustrative embodiment, may include a variable slot intent identifier 900, a multi-value slot identifier 902, a numeric slot identifier 904, a multi-value/numeric slot replacer 906, and a data structure updater 916. Each of variable slot intent identifier 900, multi-value slot identifier 902, numeric slot identifier 904, multi-value/numeric slot replacer 906, and data structure updater 916 may include one or more computer programs stored within memory 204 of variable slot update system 210, which, upon execution by processor(s) 202 thereof, cause one or more functionalities associated with those components to be performed. In some embodiments, de-lexicalization system 504 may assist in recognizing a type of update to be performed, as will be described in greater detail below.

Variable slot intent identifier 900 may, in some embodiments, be configured to identify whether an intent is associated with one or more variable slots. Intent information, as output by language understanding system 200, may indicate an intent determined to be associated with a particular utterance. Based on that intent, a domain may be identified with which the intent is associated. Variable slot update system 210, and in particular de-lexicalization system 504, may, in some embodiments, be configured to determine whether the slots associated with that intent/domain that was identified by language understanding system 200 may include one or more variable slots. A variable slot, as described herein, may correspond to a slot that is capable of taking on multiple values and/or an adjustable value (e.g., a value that may be increased or decreased).

Variable slot intent identifier 900 may, upon receipt of the intent information, access variable slot intents 910 to determine whether that intent is determined to include one or more variable slots. For example, consider the restaurant domain. The restaurant domain may include one or more intents, such as an intent to make a reservation, an intent to add guests to a reservation, an intent to modify a number of guests associated with, and so on. Some of these intents may be determined by conversation management system 140, based on dialogue rules stored within dialogue rules database 170, to include multiple slots. Therefore, if the intent information output by language understanding system 200 indicates an intent and domain associated with a particular utterance corresponds to one of the previously classified intents having one or more variable slots, then variable slot intent identifier 900 may recognize that this particular utterance may include one or more variable slots.

Multi-value slot identifier 902 may be configured to receive an indication from variable slot intent identifier 900 that indicates that a particular utterance may include one or more variable slots. Furthermore, multi-value slot identifier 902 may receive slot-value pair data produced by language understanding system 200. Based on the indication and data received, multi-value slot identifier 902 may determine whether any of the slots correspond to multi-value slots.

In some embodiments, multi-value slot identifier 902 may employ one or more multi-value slot types 912 to identify the types of multi-value slots that may be included within an utterance. The types of multi-value slots 912 may be based on the slot-value pair data, representing the one or more slot-value pairs included within the utterance, as well as the intent associated with that utterance and the domain with which that domain corresponds. For example, in the case of an intent associated with the restaurant domain, some multi-value slots may include guest names (e.g., the "PName" slot) and menu items. Therefore, if the slot-value pair data indicates that a slot from the utterance includes a "Name" slot, then multi-value slot identifier 902 may identify that this slot may correspond to a multi-value slot, such as a "PName" slot.

Numeric slot identifier 904, which may also be referred to herein interchangeably as an adjustable slot identifier, may be configured to receive an indication from variable slot intent identifier 900 that indicates that a particular utterance may include one or more variable slots. Furthermore, numeric slot identifier 904 may also receive slot-value pair data produced by language understanding system 200. Based on the indication and data received, numeric slot identifier 904 may determine whether any of the slots correspond to numeric slots, which may also be referred to herein interchangeably as adjustable slots.

In some embodiments, numeric slot identifier 904 may employ one or more numeric slot types 914, which may also be referred to herein interchangeably as adjustable slot types, to identify the types of adjustable slots that may be included within an utterance. The types of adjustable/numeric slots 914 may be based on the slot-value pair data, representing the one or more slot-value pairs included within the utterance, as well as the intent associated with that utterance and the domain with which that domain corresponds. For example, in the case of the intent associated with the restaurant domain, some adjustable/numeric slots may include number of guests (e.g., the "RNumGuest" slot). Therefore, if the slot-value pair data indicates that a slot from the utterance includes a "Number of Guests" slot, then numeric slot identifier 904 may identify that this slot may correspond to a numeric/adjustable slot, such as a "RNumGuest" slot.

Multi-value/Numeric slot replacer 906, which may also be referred to herein interchangeably as multi-value/adjustable slot replacer, may be configured to generate an instruction to have a data structure associated with the slot-value pair(s) be changed to now include the appropriate variable slot(s). For example, if multi-value slot identifier 902 determines that one of the slots from the slot-value pair data should be changed to a multi-value slot, multi-value/numeric slot replacer 906 may generate the instruction to replace that slot with a multi-value slot. Multi-value/numeric slot replacer 906 may also be configured to identify the data structure representing a particular data object based on the estimated intent of the utterance. For example, if the utterance corresponds to adding one or more names to a reservation, multi-value/numeric slot replacer 906 may identify that the data structure which with the utterance corresponds represents a data object associated with a reservation. Therefore, replacer 906 may identify the data structure representing the reservation data object appropriate for the utterance (e.g., based on a previous utterance received from user device 110, user information associated with user device 110, etc.), in order to properly determine which slot in the data structure is to be updated to now be a variable slot.

Data structure updater 916 may be configured to perform the update to the data structure by assigning one or more values to the data structure having the variable slot form. For example, if the utterance is "Add Jack to the reservation," then the update may be to change the data structure such that the "Name" slot now becomes the multi-value slot "PName," and then add the value "Jack" to the multi-value slot. Data structure updater 916 may then output the data structure update, which may cause the data structure—which may be stored within memory 204 of variable slot update system 210—to be updated accordingly.

Figure 9B:
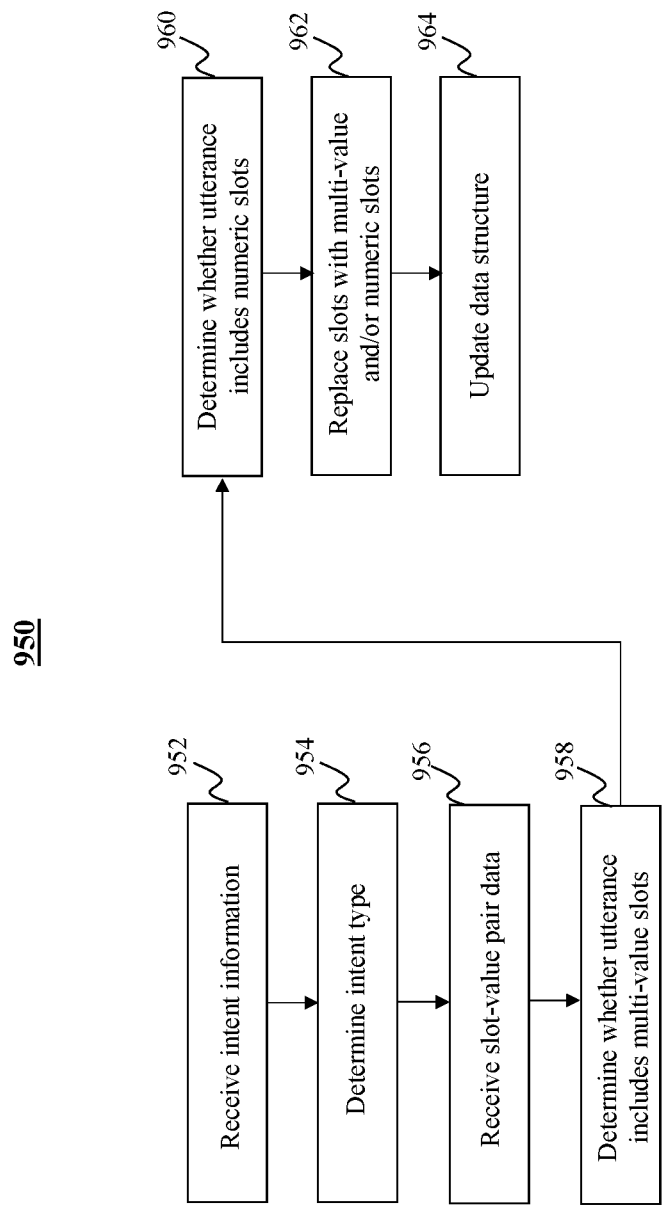
FIG. 9B is an illustrative flowchart of an exemplary processor for updating a data structure, in accordance with various embodiments of the present teaching.

FIG. 9B is an illustrative flowchart of an exemplary processor for updating a data structure, in accordance with various embodiments of the present teaching. Process 950, in a non-limiting embodiment, may begin at step 952. At step 952, intent information may be received. At step 954, an intent type may be determined. For instance, variable slot identifier 900 may determine whether the intent information received indicates that an utterance's intent is associated with a variable slot intent, including one or more variable slots.

At step 956, slot-value pair data may be received. At step 958, a determination may be made as to whether the utterance includes one or more multi-value slots. For instance, multi-value slot identifier 902 may determine, using multi-value slot types 912, whether the variable slot intent identified for the utterance includes one or more multi-value slots. At step 960, a determination may be made as to whether the utterance includes one or more numeric/adjustable slots. For instance, numeric slot identifier 904 may determine, using numeric slot types 914, whether the variable slot intent identified for the utterance includes one or more numeric slots. In some embodiments, the intent may include both multi-value slots and numeric slots.

At step 962, the slots from the slot-value pair data may be replaced with one or more multi-value slots and/or numeric/adjustable slots. For instance, multi-value/numeric slot replacer 906 may generate an instruction to update a data structure corresponding to the data object identified based on the utterance's intent. At step 964, the data structure may be updated. For example, the data structure may be updated such that the non-variable slot (e.g., a single value slot) is replaced with a variable slot (e.g., a multi-variable slot).

Figure 10A:
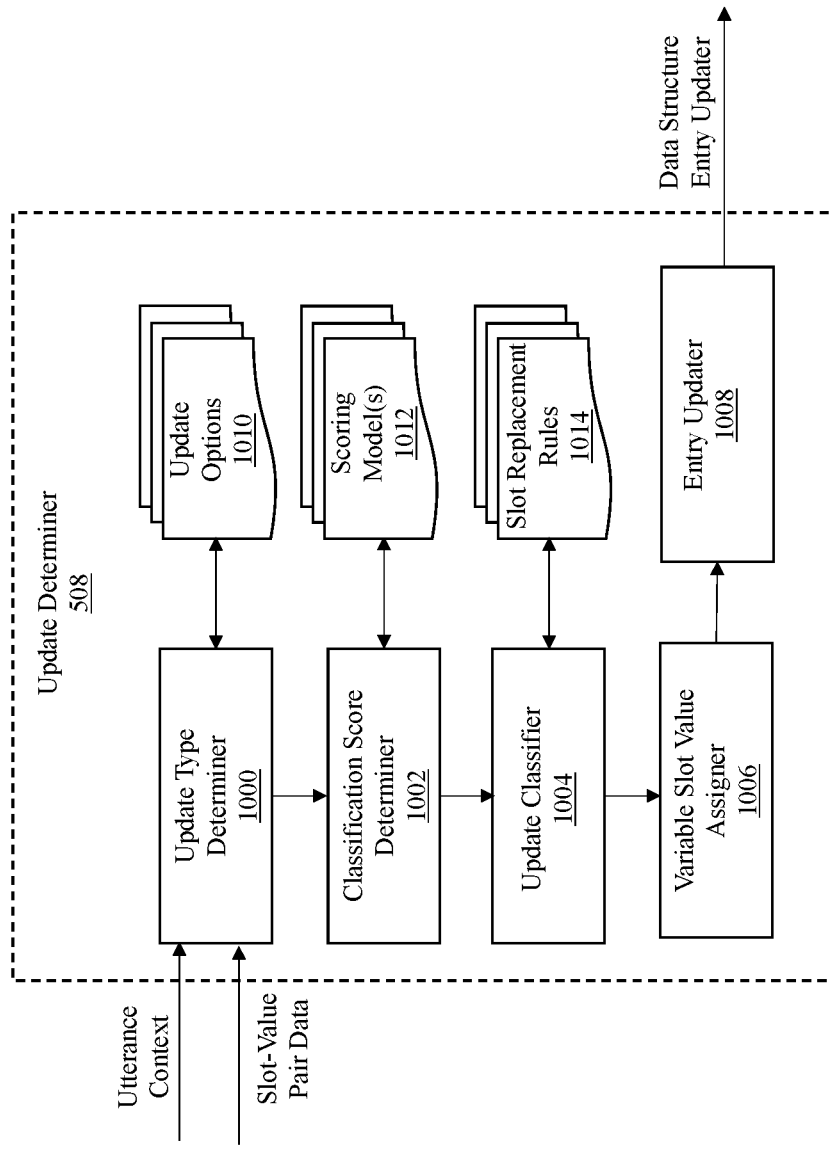
FIG. 10A is an illustrative diagram of an exemplary update determiner, in accordance with various embodiments of the present teaching.

FIG. 10A is an illustrative diagram of an exemplary update determiner, in accordance with various embodiments of the present teaching. Update determiner 506, in the illustrative embodiment, may include an update type determiner 1000, a classification score determiner 1002, an update classifier 1004, a variable slot value assigner 1006, and an entry updater 1008. Each of update type determiner 1000, classification score determiner 1002, update classifier 1004, variable slot value assigner 1006, and entry updater 1008 may include one or more computer programs stored within memory 204 of variable slot update system 210, which, upon execution by processor(s) 202 thereof, cause one or more functionalities associated with those components to be performed.

Update type determiner 1000 may, in some embodiments, be configured to determine a type of update that an utterance corresponds to. For example, based on the determined utterance context and the slot-value pair data, update type determiner 1000 may determine whether the utterance refers to one of the pre-defined update options 1010. Update options 1010 may, for example, include such updates as appending, removing, increasing, decreasing, replacing, and/or no update.

An appending type of update may correspond to an update by which a value is appended to a particular slot. For example, looking at dialogue 300 of FIG. 3A, the slot "PName," may be appended such that data structure 306 includes the values "Michelle" and "Nancy" as being associated with the "PName" slot. A removing type of update may correspond to an update by which a value removed from being associated with a particular slot. For example, looking at dialogue 310 of FIG. 3A, the slot "PName," which previously—in data structure 306—included the values "Michelle" and "Nancy" as being associated therewith now has the value "Nancy" removed from associated with the slot "PName." An increasing type of update may correspond to an update by which a value associated with a particular slot is increased by a certain value. For example, looking at dialogues 320 and 330 of FIGS. 3C and 3D, the slot "RNumGuest" may be increased from the value "2" to the value "5" in response to utterance 332 indicating that the value of slot "RNumGuest" of data structure 326 is to be updated by an amount equal to three. Conversely, a decreasing type of update may correspond to an update by which a value associated with a particular slot is decreased by a certain value. For example, as seen in dialogue 340 of FIG. 3E, the value associated with the slot "RNumGuest" may be decreased by a value "1" from its previous value as seen within data structure 336 based on utterance 342.

A replace type of update may correspond to a mechanism by which a value associated with a slot is replaced by a new value. For example, in utterance 316, there is no value assigned to the slot "RNumGuest." However, based on the intent of utterance 322, the value of the slot "RNumGuest" may be replaced with the value "2". No update may also be a type of update. For example between dialogues 300 and 310, there may be no value associated with the slot "RNumGuest." Therefore, in this scenario, no update has been performed to the data structure for slot "RNumGuest."

Classification score determiner 1002 may be configured to determine a classification score for the type of update determined by update type determiner 1000. For example, using scoring models 1012, classification score determiner 1002 may calculate a score associated with each intent hypothesis' corresponding type of update. Based on the classification score, a highest scored context/intent for an utterance may be selected as the appropriate intent/context for that utterance.

Update classifier 1004 may be configured to determine a classification associated with an utterance based on the utterance's context and slot-value pair data. For example, using slot replacement rules 1014, update classifier 1004 may specify how a particular utterance may be classified to a particular type of update. In some embodiments, update classifier 1004 may work with de-lexicalization system 504 to adapt and learn slot replacement rules 1014 for updating a slot with one or more variable slots, as well as classifying an update associated with a slot. For example, referring back to FIG. 9A, de-lexicalization system 504 may identify when a sentence structure associated with an intent that is replaced with variable slots matches to a certain confidence level another sentence structure. For example, consider the utterances "Add John and Jack to the invitation," and "Add a drink and sandwich to the order." De-lexicalization system 504 may replace the slots of the two utterances such that they respectively take the forms, "Add {Multi-Value} and {Multi-Value} to the invitation," and "Add a {Multi-Value} and a {Multi-Value} to my order." Since both utterances take on a similar format when de-lexicalized, update classifier 1004 may train slot replacement rules 1014 to look for formats of similar types to known sentence structures in order to identify variable slots.

Furthermore, considering the example above again, update classifier 1004 may recognize when two utterances, associated with two different domains, have a similar format. In this scenario, update classifier 1004 may train slot replacement rules 1014 to look across multiple domains and train data for identifying variable slots in one domain based on the analysis/recognition of variable slots in another domain. This technique may be particularly useful when generating training data to be used by context determiner 610. For example, if a first and second slot are both of a first slot type (e.g., correspond to a first entity type), but training data for the first slot only exists, because of the similarities between the slots, additional training data may be generated for the second slot.

Variable slot value assigner 1006 may, in some embodiments, be configured to assign a value to a variable slot based on the type of update determined and the slot value. For example, variable slot value assigner 1006 may generate an instruction to append a value to a slot included within a data structure representing a data object, remove a value from being associated with a slot included within a data structure representing a data object, increase a value of a slot by a particular amount in the data structure, decrease a value of a slot by a particular amount in the data structure, replace a value associated with a slot in a data structure by a new value, and/or perform no change to the value associated with a slot (if any) in a data structure. Entry updater 1008 may be configured to generate an output the data structure entry update such that the data structure will be updated based on the type of update, the initial value associated with a particular slot, and a new value to be associated with that slot.

Figure 10B:
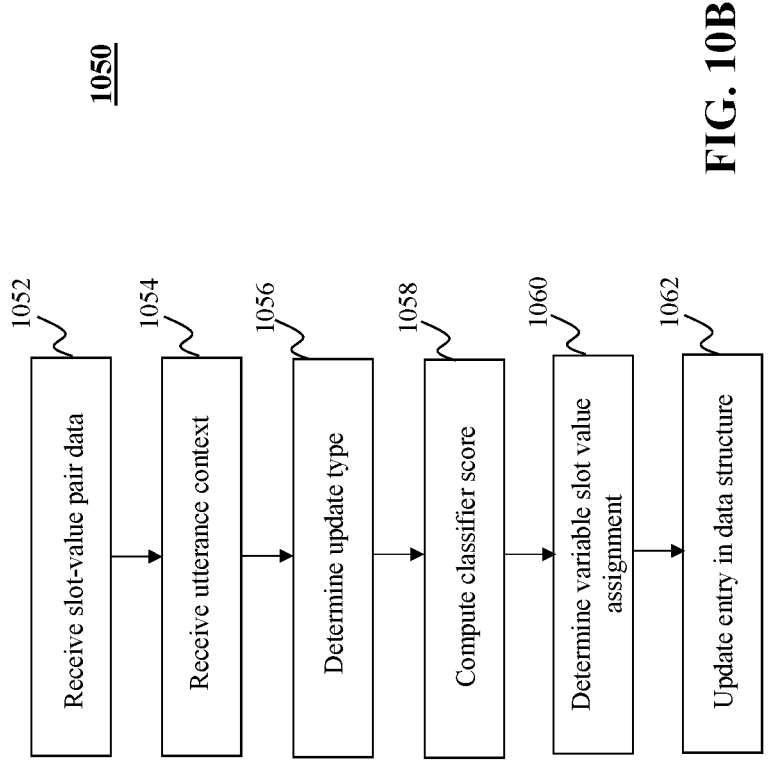
FIG. 10B is an illustrative flowchart of an exemplary process for updating an entry in a data structure, in accordance with various embodiments of the present teaching.

FIG. 10B is an illustrative flowchart of an exemplary process for updating an entry in a data structure, in accordance with various embodiments of the present teaching. Process 1050, in a non-limiting embodiment, may begin at step 1052. At step 1052, slot-value pair data may be received. At step 1054, a context of an utterance may be received. At step 1056, a type of update to be performed to an entry in a data structure representing a data object may be determined. For instance, update type determiner 1000 may determine, based on the utterance's context and the slot-value pair data, a type of update or updates from update options 1010 with which to be performed.

At step 1056, a classifier score may be computed. The classifier score may, in some embodiments, be computed by classification score determiner 1002 using one or more scoring model(s) 1012. Classification score determiner 1002, for instance, may determine a classification score for each intent hypothesis, such that each intent hypothesis's corresponding type of update is scored. Thus, in some embodiments, a top scored type of update may be employed, and/or a top scored intent may be selected.

At step 1060, a value assignment for a variable slot, or slots, may be determined. For instance, variable slot value assigner 1006 may determine the values to be assigned to a particular slot based on the update to that slot to be performed. At step 1062, an entry in a data structure may be updated to include the newly assigned value or values. For example, entry updater 1008 may update, or cause the update, to the data structure to be performed.

Figure 11A:
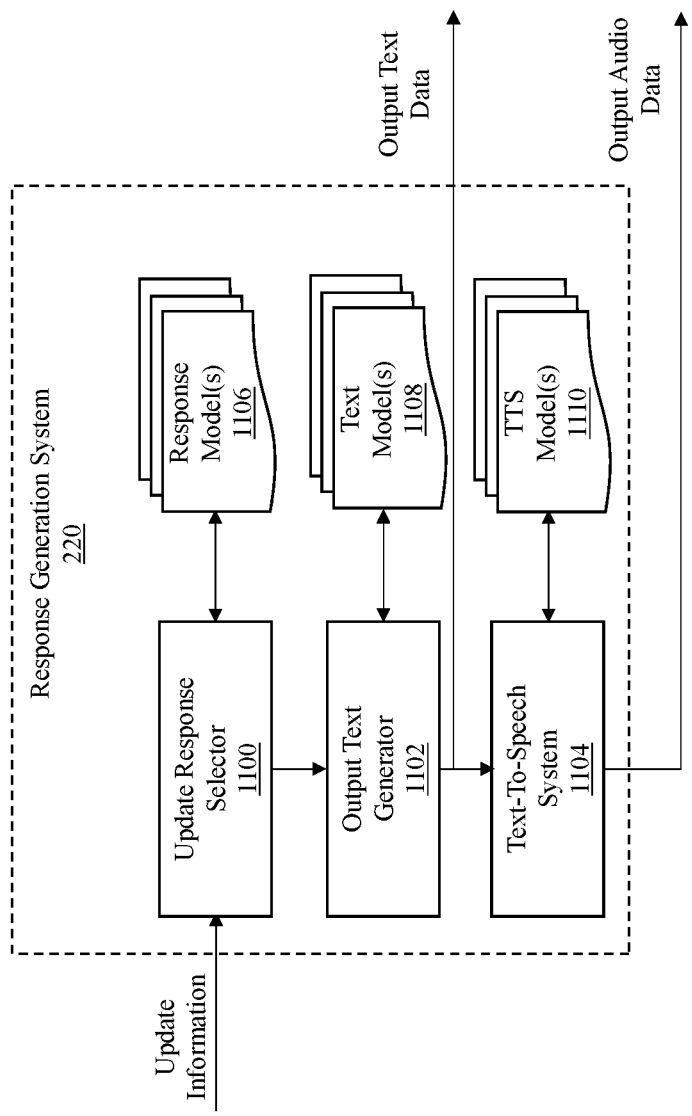
FIG. 11A is an illustrative diagram of an exemplary response generation system, in accordance with various embodiments of the present teaching.

FIG. 11A is an illustrative diagram of an exemplary response generation system, in accordance with various embodiments of the present teaching. Response generation system 220, in the illustrative embodiment, may include an update response selector 1100, an output text generator 1102, and a text-to-speech ("TTS") system 1104. Each of update response selector 1100, output text generator 1102, and TTS system 1104 may include one or more computer programs stored within memory 204 of response generation system 220, which, upon execution by processor(s) 202 thereof, cause one or more functionalities associated with those components to be performed.

Update response selector 1100 may be configured to a select a response to be output to user 102 via user device 110. In some embodiments, the response selected may be one of response models 1106. For instance, depending on the utterance's intent, the type of update to be performed, and the domain, a particular response for an utterance may be selected. As an illustrative example, if the utterance is "{Action} {Name} to {Object} (e.g., "Add Jack to my reservation") then the response selected may be of the form "Ok. {Name} {Action} to {Object}" (e.g., "Ok. Jack is added to your reservation"). In some embodiments, response model(s) 1106 may work with update response selector 1100 to modify a tense of one or more words. For example, if the utterance uses a present tense of a verb, then the response may include a past tense version of the verb, indicating that the action has been performed.

Output text generator 1102 may be configured, in some embodiments, to generate output text representing the response. The output text may be modeled using one or more text model(s) 1108. For example, text model(s) 1108 may include sentence/grammar rules to facilitate coherent sentence formation for the output text. In some embodiments, after generating the output text, output text generator 1102 may output the text data representing the response to user device 110 (e.g., response 308).

TTS system 1104, in some embodiments, may be configured to generate output audio data representing one or more computer-generated utterances and/or recordings of speech. The audio data may be generated based on an audio message to be output to user 102 via user device 110. TTS system 1104 may employ TTS model(s) 1110 to specify how to convert particular text to speech, including computer generated renderings of phonemes and words. In some embodiments, TTS system 1104 may receive the text data from output text generator 1102, if the output response is to include audio. For example, update response selector 1100 may select an audio response as a type of response from response model(s) 1106 if necessitated by the updater information and/or utterance. Persons of ordinary skill in the art will recognize that not all responses may be audible, and the aforementioned is merely illustrative. TTS system 1104 may be configured to output the audio data representing the response in addition to, or instead of, the text data. The audio data, for example, may be provided to user device 110 and output thereby.

Figure 11B:
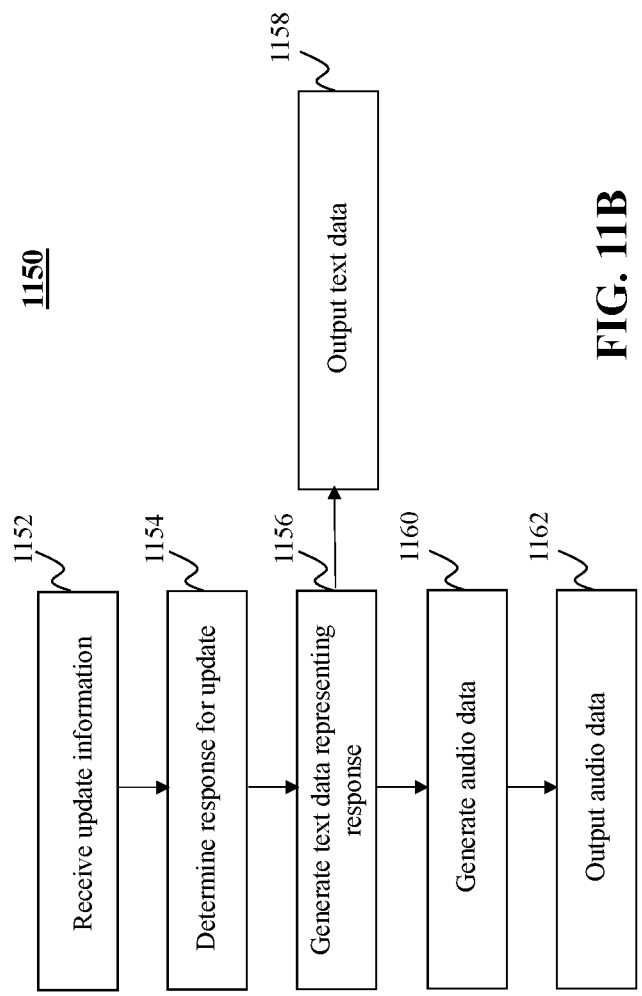
FIG. 11B is an illustrative flowchart of an exemplary process for generating output data, in accordance with various embodiments of the present teaching.

FIG. 11B is an illustrative flowchart of an exemplary process for generating output data, in accordance with various embodiments of the present teaching. Process 1150 may, in a non-limiting embodiment, begin at step 1152. At step 1152, update information may be received. The update information may indicate a type of update that may have been performed by variable slot update system 210. At step 1154, a response for the update may be determined. For example, update response selector 1100 may select a response from response models 1106 based on the received update information. In some embodiments, update response selector 1100 may select a response to include text and/or audio to be output to user device 110.

At step 1156, text data representing the response may be generated. For instance, output text generator 1102 may generate text data represented the selected response using text models 1108. At step 1158, the text data may be output to user device 110 from response generation system 220. At step 1160, audio data representing the text data and/or any other suitable audio may be generated. For instance, TTS system 1104 may generate audio data representing the text data generated by output text generator 1102 using TTS model(s) 1110. At step 1162, the audio data may be output to user device 110. In some embodiments, if no audio data is determined to be needed for the response, then process 1150 may end at step 1159.

Figure 12:
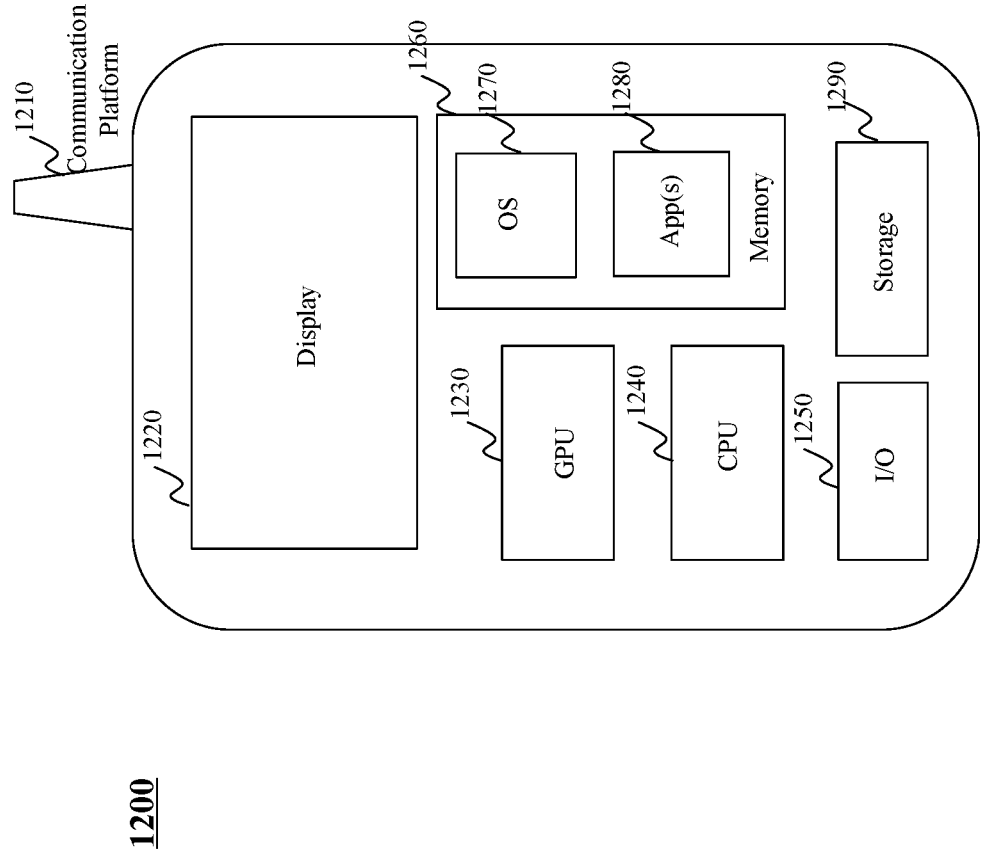
FIG. 12 is an illustrative diagram of an exemplary mobile device architecture that may be used to realize a specialized system implementing the present teaching in accordance with various embodiments.

FIG. 12 is an illustrative diagram of an exemplary mobile device architecture that may be used to realize a specialized system implementing the present teaching in accordance with various embodiments. In this example, the user device on which the conversation management systems and methods is implemented corresponds to a mobile device 1200, including, but is not limited to, a smart phone, a tablet, a music player, a handled gaming console, a global positioning system (GPS) receiver, and a wearable computing device (e.g., eyeglasses, wrist watch, etc.), or in any other form factor. Mobile device 1200 may include one or more central processing units ("CPUs") 1240, one or more graphic processing units ("GPUs") 1230, a display 1220, a memory 1260, a communication platform 1210, such as a wireless communication module, storage 12690, and one or more input/output (I/O) devices 1240. Any other suitable component, including but not limited to a system bus or a controller (not shown), may also be included in the mobile device 1200. As shown in FIG. 12 a mobile operating system 1270 (e.g., iOS, Android, Windows Phone, etc.), and one or more applications 1280 may be loaded into memory 1260 from storage 1290 in order to be executed by the CPU 1240. The applications 1280 may include a browser or any other suitable mobile apps for carrying out intelligent conversation management on mobile device 1200. User interactions with the content may be achieved via the I/O devices 1240 and provided to the conversation management system 140 via network(s) 120.

To implement various modules, units, and their functionalities described in the present disclosure, computer hardware platforms may be used as the hardware platform(s) for one or more of the elements described herein (e.g., conversation management system 140). The hardware elements, operating systems and programming languages of such computers are conventional in nature, and it is presumed that those skilled in the art are adequately familiar therewith to adapt those technologies to appropriate settings as described herein. A computer with user interface elements may be used to implement a personal computer (PC) or other type of work station or terminal device, although a computer may also act as a server if appropriately programmed. It is believed that those skilled in the art are familiar with the structure, programming and general operation of such computer equipment and as a result the drawings should be self-explanatory.

Figure 13:
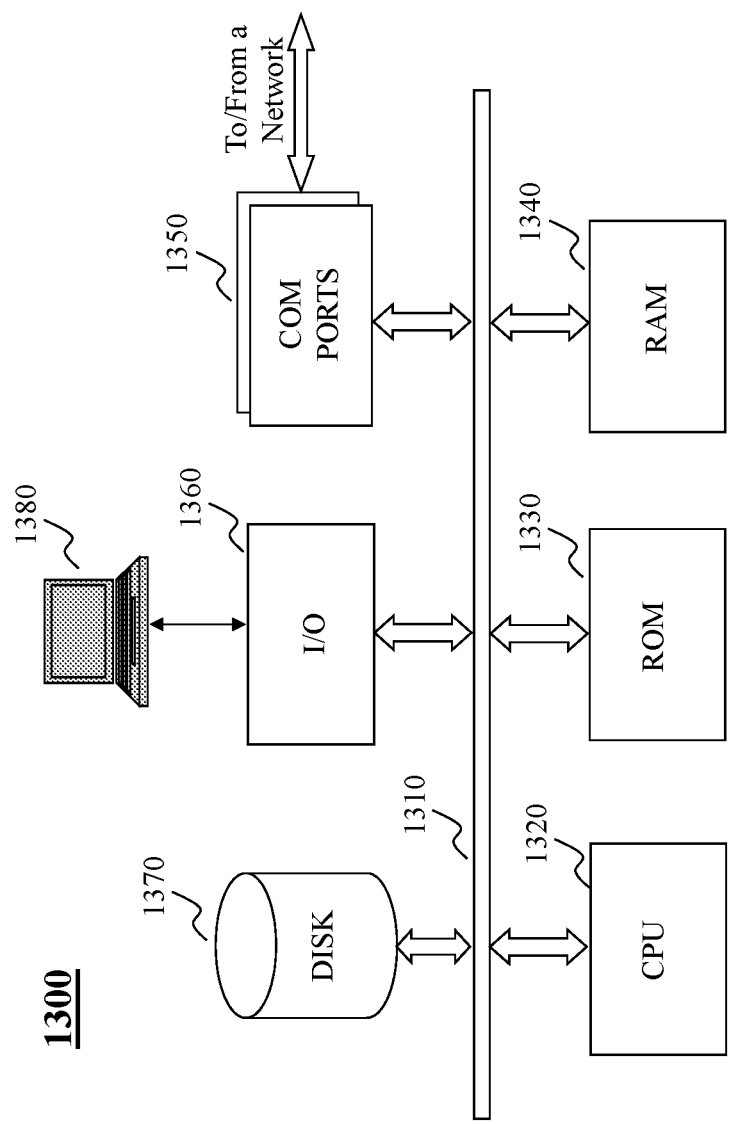
FIG. 13 is an illustrative diagram of an exemplary computing device architecture that may be used to realize a specialized system implementing the present teaching in accordance with various embodiments.

FIG. 13 is an illustrative diagram of an exemplary computing device architecture that may be used to realize a specialized system implementing the present teaching in accordance with various embodiments. Such a specialized system incorporating the present teaching has a functional block diagram illustration of a hardware platform, which includes user interface elements. The computer may be a general purpose computer or a special purpose computer. Both can be used to implement a specialized system for the present teaching. This computer 1300 may be used to implement any component of intelligent conversation management techniques, as described herein. For example, the conversation management system as described herein may be implemented on a computer such as computer 1300, via its hardware, software program, firmware, or a combination thereof. Although only one such computer is shown, for convenience, the computer functions relating to fraudulent network detection as described herein may be implemented in a distributed fashion on a number of similar platforms, to distribute the processing load.

Computer 1300, for example, includes COM ports 1350 connected to and from a network connected thereto to facilitate data communications. Computer 1300 also includes a central processing unit (CPU) 1320, in the form of one or more processors, for executing program instructions. The exemplary computer platform includes an internal communication bus 1310, program storage and data storage of different forms (e.g., disk 1370, read only memory (ROM) 1330, or random access memory (RAM) 740), for various data files to be processed and/or communicated by computer 1300, as well as possibly program instructions to be executed by CPU 1320. Computer 1300 also includes an I/O component 1360, supporting input/output flows between the computer and other components therein such as user interface elements 1380. Computer 1300 may also receive programming and data via network communications.

Hence, aspects of the methods of detecting fraudulent networks and/or other processes, as outlined above, may be embodied in programming. Program aspects of the technology may be thought of as "products" or "articles of manufacture" typically in the form of executable code and/or associated data that is carried on or embodied in a type of machine readable medium. Tangible non-transitory "storage" type media include any or all of the memory or other storage for the computers, processors or the like, or associated modules thereof, such as various semiconductor memories, tape drives, disk drives and the like, which may provide storage at any time for the software programming.

All or portions of the software may at times be communicated through a network such as the Internet or various other telecommunication networks. Such communications, for example, may enable loading of the software from one computer or processor into another, for example, in connection with an intelligent conversation management system. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible "storage" media, terms such as computer or machine "readable medium" refer to any medium that participates in providing instructions to a processor for execution.

Hence, a machine-readable medium may take many forms, including but not limited to, a tangible storage medium, a carrier wave medium or physical transmission medium. Non-volatile storage media include, for example, optical or magnetic disks, such as any of the storage devices in any computer(s) or the like, which may be used to implement the system or any of its components as shown in the drawings. Volatile storage media include dynamic memory, such as a main memory of such a computer platform. Tangible transmission media include coaxial cables; copper wire and fiber optics, including the wires that form a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a physical processor for execution.

Those skilled in the art will recognize that the present teachings are amenable to a variety of modifications and/or enhancements. For example, although the implementation of various components described above may be embodied in a hardware device, it may also be implemented as a software only solution—e.g., an installation on an existing server. In addition, the conversation management techniques as disclosed herein may be implemented as a firmware, firmware/software combination, firmware/hardware combination, or a hardware/firmware/software combination.

While the foregoing has described what are considered to constitute the present teachings and/or other examples, it is understood that various modifications may be made thereto and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

We claim:

1. A method for processing utterances, the method being implemented on at least one machine comprising at least one processor, memory, and a communication platform connected to a network, and the method comprising:
   estimating a first intent associated with a first utterance;
   determining that the first intent is associated with a predetermined domain having a first entity corresponding to a first multi-variable slot;
   obtaining a slot-value pair for the first utterance, the slot-value pair comprising a first single-value slot corresponding to the first entity and a first value associated with the first single-value slot;
   estimating a data object based on the first utterance;
   updating, based on the first intent, a data structure for representing the data object by replacing the first single-value slot with the first multi-variable slot, wherein the updated data structure includes the first multi-variable slot of the first entity, wherein a value of the first multi-variable slot is adjustable in response to a second utterance subsequent to the first utterance; and
   assigning the first value to the first multi-variable slot in the updated data structure such that the value of the first multi-variable slot is the first value.

2. The method of claim 1, wherein the value of the first multi-variable slot is configured to be increased or decreased.

3. The method of claim 1, wherein the second utterance indicates a second value associated with the first multi-variable slot, the method further comprising:
re-assigning the second value to the first multi-variable slot.

4. The method of claim 1, wherein the second utterance indicates removing the first value of the first multi-variable slot in the updated data structure, the method further comprising:
removing, based on the second utterance, the first value from the updated data structure.

5. The method of claim 1, where the first multi-variable slot corresponds to multiple values.

6. The method of claim 5, wherein the second utterance indicates removing at least one of the multiple values of the first multi-variable slot in the updated data structure, the method further comprising:
removing, based on the second utterance, the at least one of the multiple values from the updated data structure.

7. The method of claim 1, wherein the data object corresponds to an event indicated by the first utterance.

8. A non-transitory, computer-readable medium having information recorded thereon for processing utterances, when read by at least one processor, effectuate operations comprising:
estimating a first intent associated with a first utterance;
determining that the first intent is associated with a predetermined domain having a first entity corresponding to a first multi-variable slot;
obtaining a slot-value pair for the first utterance, the slot-value pair comprising a first single-value slot corresponding to the first entity and a first value associated with the first single-value slot;
estimating a data object based on the first utterance;
updating, based on the first intent, a data structure for representing the data object by replacing the first single-value slot with the first multi-variable slot, wherein the updated data structure includes the first multi-variable slot of the first entity, wherein a value of the first multi-variable slot is adjustable in response to a second utterance subsequent to the first utterance; and
assigning the first value to the first multi-variable slot in the updated data structure such that the value of the first multi-variable slot is the first value.

9. The medium of claim 8, wherein the value of the first multi-variable slot is configured to be increased or decreased.

10. The medium of claim 8, wherein the second utterance indicates a second value associated with the first multi-variable slot, the operations further comprising:
re-assigning the second value to the first multi-variable slot.

11. The medium of claim 8, wherein the second utterance indicates removing the first value of the first multi-variable slot in the updated data structure, the operations further comprising:
removing, based on the second utterance, the first value from the updated data structure.

12. The medium of claim 8, where the first multi-variable slot corresponds to multiple values.

13. The medium of claim 12, wherein the second utterance indicates removing at least one of the multiple values of the first multi-variable slot in the updated data structure, the operations further comprising:
removing, based on the second utterance, the at least one of the multiple values from the updated data structure.

14. The medium of claim 8, wherein the data object corresponds to an event indicated by the first utterance.

15. A system for processing utterances, the system comprising:
memory storing computer program instructions; and
one or more processors that, in response to executing the computer program instructions, effectuate operations comprising:
estimating a first intent associated with a first utterance;
determining that the first intent is associated with a predetermined domain having a first entity corresponding to a first multi-variable slot;
obtaining a slot-value pair for the first utterance, the slot-value pair comprising a first single-value slot corresponding to the first entity and a first value associated with the first single-value slot;
estimating a data object based on the first utterance;
updating, based on the first intent, a data structure for representing the data object by replacing the first single-value slot with the first multi-variable slot, wherein the updated data structure includes the first multi-variable slot of the first entity, wherein a value of the first multi-variable slot is adjustable in response to a second utterance subsequent to the first utterance; and
assigning the first value to the first multi-variable slot in the updated data structure such that the value of the first multi-variable slot is the first value.

16. The system of claim 15, wherein the value of the first multi-variable slot is configured to be increased or decreased.

17. The system of claim 15, wherein the second utterance indicates a second value associated with the first multi-variable slot, the operations further comprising:
re-assigning the second value to the first multi-variable slot.

18. The system of claim 15, wherein the second utterance indicates removing the first value of the first multi-variable slot in the updated data structure, the operations further comprising:
removing, based on the second utterance, the first value from the updated data structure.

19. The system of claim 15, where the first multi-variable slot corresponds to multiple values.

20. The system of claim 19, wherein the second utterance indicates removing at least one of the multiple values of the first multi-variable slot in the updated data structure, the operations further comprising:
removing, based on the second utterance, the at least one of the multiple values from the updated data structure.

* * * * *